(12) United States Patent
Mar et al.

(10) Patent No.: US 9,077,491 B2
(45) Date of Patent: Jul. 7, 2015

(54) THREE LAYER CASCADE ADAPTIVE NEURAL FUZZY INFERENCE SYSTEM (ANFIS) BASED INTELLIGENT CONTROLLER SCHEME AND DEVICE

(71) Applicant: YUAN ZE UNIVERSITY, Taoyuan (TW)

(72) Inventors: Jeich Mar, Taoyuan (TW); Kuei-Chou Tsai, Taipei (TW); Yu-Ting Wang, Taoyuan (TW)

(73) Assignee: YUAN ZE UNIVERSITY, Taoyuan (TW)

(*) Notice: Subject to any disclaimer, the term of this patent is extended or adjusted under 35 U.S.C. 154(b) by 44 days.

(21) Appl. No.: 13/969,794

(22) Filed: Aug. 19, 2013

(65) Prior Publication Data
US 2014/0087749 A1    Mar. 27, 2014

(30) Foreign Application Priority Data

Sep. 21, 2012  (TW) .............................. 101134683 A

(51) Int. Cl.
| | |
|---|---|
| H04L 5/00 | (2006.01) |
| G06N 7/00 | (2006.01) |
| G06N 7/04 | (2006.01) |
| G06N 3/04 | (2006.01) |
| H04W 52/20 | (2009.01) |

(Continued)

(52) U.S. Cl.
CPC .............. *H04L 5/0037* (2013.01); *G06N 7/046* (2013.01); *G06N 3/0436* (2013.01); *H04L 5/0023* (2013.01); *H04L 5/0058* (2013.01); *Y02B 60/50* (2013.01); *H04W 52/20* (2013.01); *H04W 52/241* (2013.01); *H04W 52/243* (2013.01); *H04W 52/267* (2013.01)

(58) Field of Classification Search
USPC ............................................... 455/441, 452.2
See application file for complete search history.

(56) References Cited

U.S. PATENT DOCUMENTS

| | | | |
|---|---|---|---|
| 6,212,174 B1* | 4/2001 | Lomp et al. .................... 370/335 |
| 7,117,014 B1* | 10/2006 | Van Rensburg et al. ...... 455/561 |
| 2002/0034169 A1* | 3/2002 | Ozluturk et al. .............. 370/335 |

(Continued)

OTHER PUBLICATIONS

C. H. Jiang, J. K. Lian, R. M. Weng, C. H. Hsu, "Multi-rate DS-CDMA with ANFIS-assisted power control for wireless multi-media communications," International Journal of Innovative Computing, Information and Control, vol. 6, No. 8, pp. 3641-3655, Aug. 2010.*

(Continued)

*Primary Examiner* — Vladimir Magloire
*Assistant Examiner* — David Orange
(74) *Attorney, Agent, or Firm* — WPAT, PC; Justin King

(57) ABSTRACT

Intelligent technique is an effective method to perform the network resource management. A three layer cascade adaptive neural fuzzy inference system (ANFIS) based intelligent controller is proposed for the mobile wireless network to optimize the maximum average throughput, minimum transmit power and interference for multimedia call services. The proposed intelligent controller is designed with a three layer cascade architecture, which mainly contains an ANFIS rate controller (ARC) in the first layer, an ANFIS power controller (APC) in the second layer and an ANFIS interference controller (AIC) in the third layer. The design aim of the proposed three layer cascade ANFIS cognitive engine is maximizing the average throughput of the mobile wireless network, while minimizing the transmit power and interference power.

7 Claims, 40 Drawing Sheets

(51) Int. Cl.
*H04W 52/24* (2009.01)
*H04W 52/26* (2009.01)

(56) References Cited

U.S. PATENT DOCUMENTS

2003/0003914 A1* 1/2003 Kubo et al. .................. 455/441
2003/0050084 A1* 3/2003 Damnjanovic et al. ....... 455/522
2004/0204113 A1* 10/2004 Kisigami et al. ........... 455/562.1
2005/0208961 A1* 9/2005 Willenegger ................. 455/522
2008/0144493 A1* 6/2008 Yeh .............................. 370/230
2009/0274059 A1* 11/2009 Xing et al. .................... 370/252
2010/0111027 A1* 5/2010 Hart ............................. 370/329
2011/0002371 A1* 1/2011 Forenza et al. ............... 375/227

OTHER PUBLICATIONS

Jang, J.-S.R.; Sun, C.-T., "Neuro-fuzzy modeling and control," Proceedings of the IEEE, vol. 83, No. 3, pp. 378,406, Mar. 1995.*

* cited by examiner

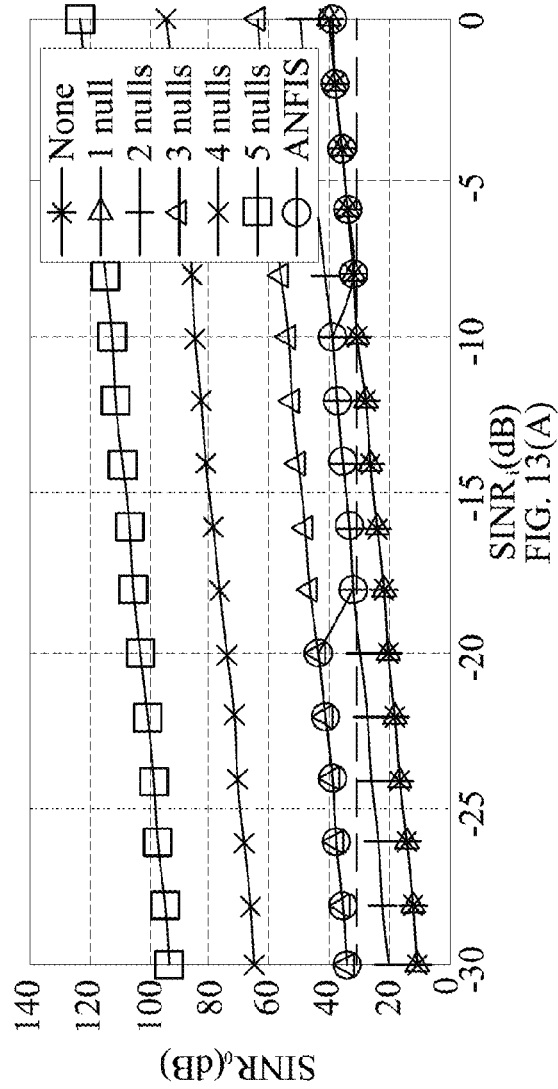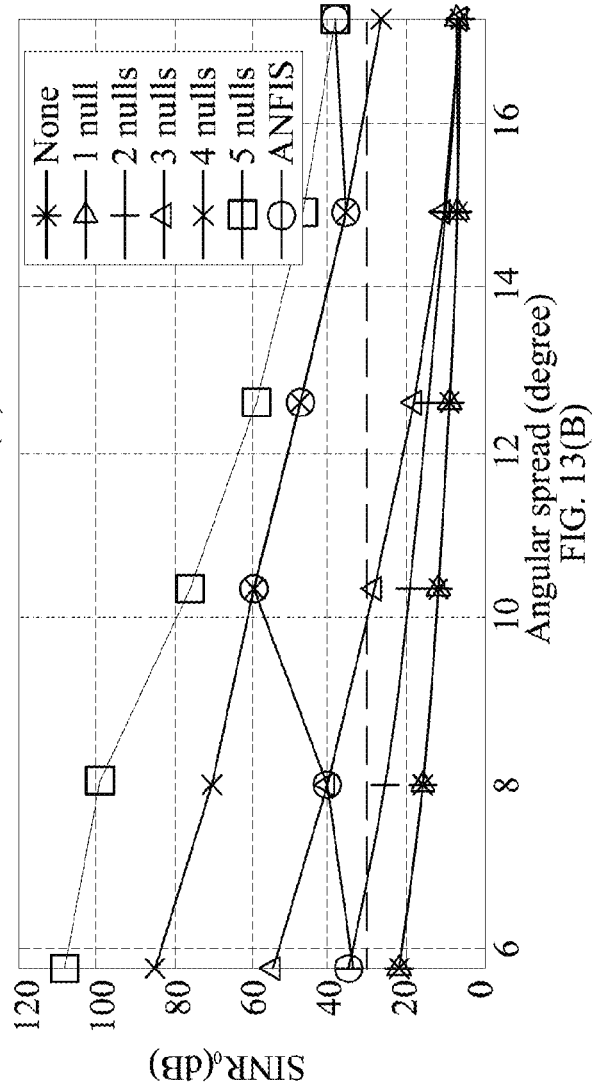
FIG. 13(A)
FIG. 13(B)

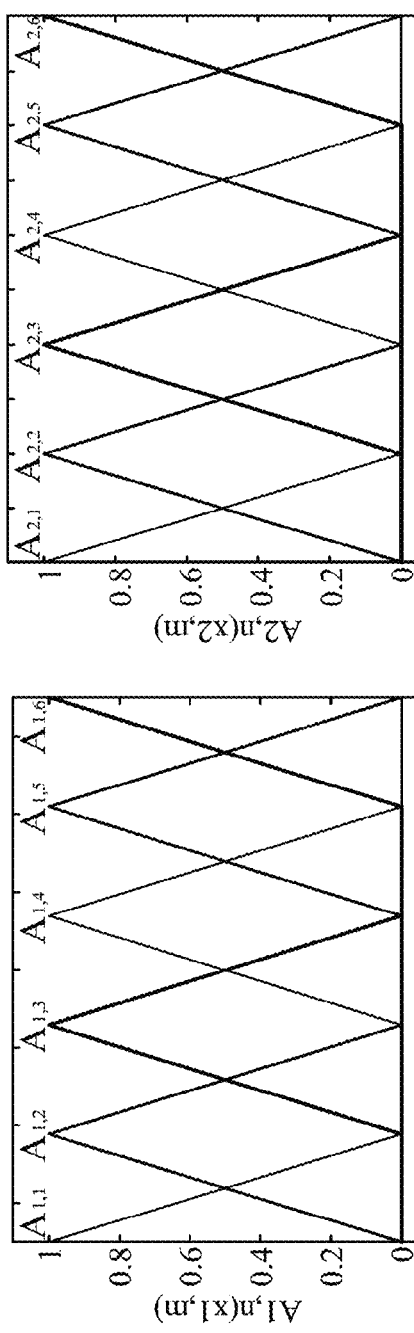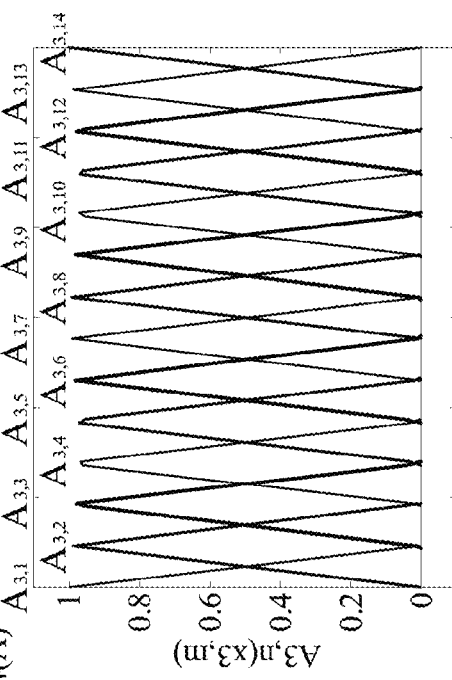
FIG. 14(A)
FIG. 14(B)
FIG. 14(C)
FIG. 14

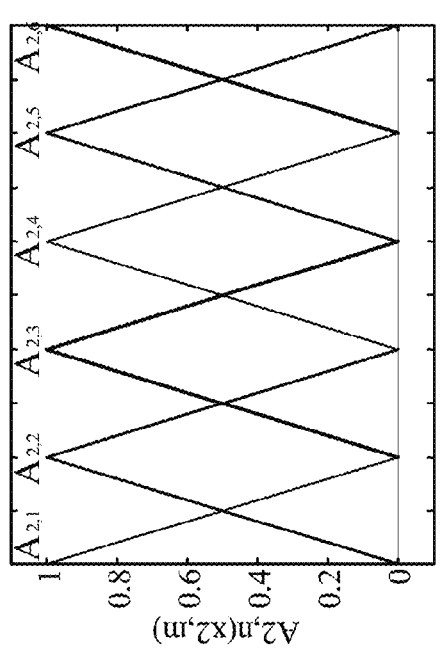
FIG. 15(A)
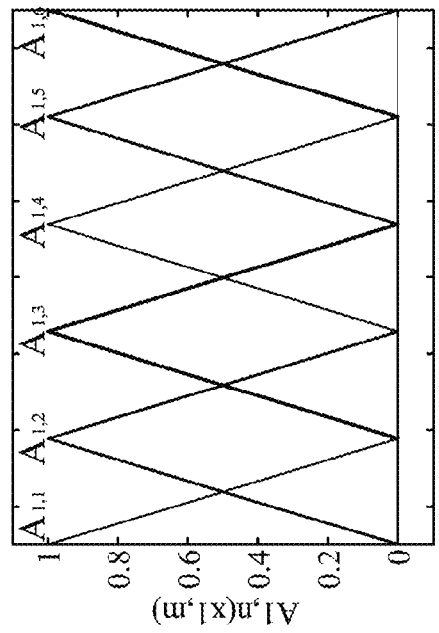
FIG. 15(B)
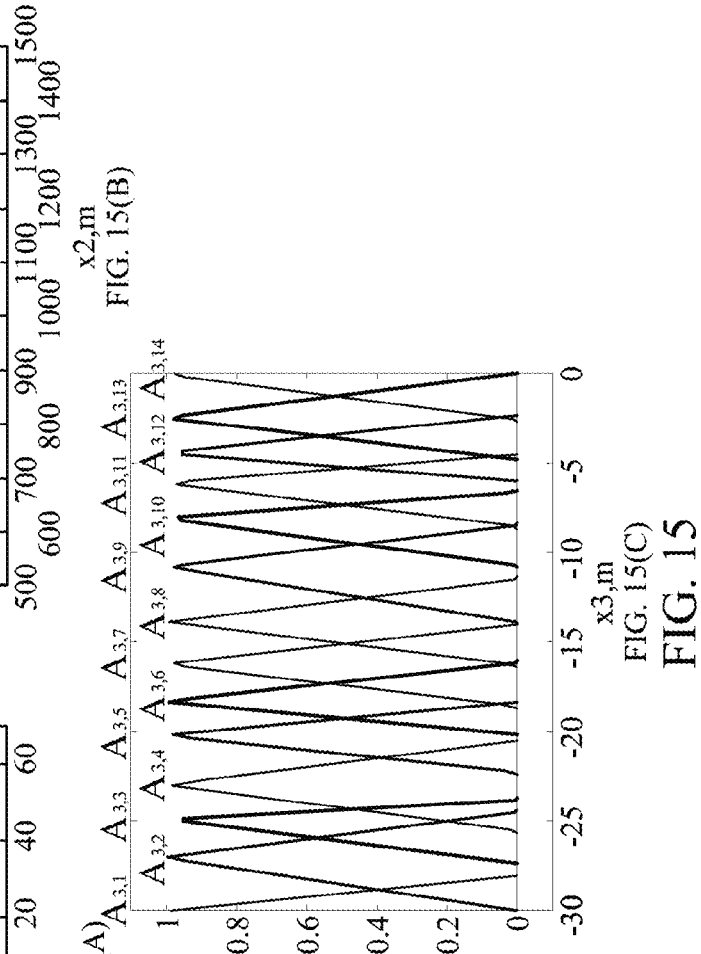
FIG. 15(C)
FIG. 15

THREE LAYER CASCADE ADAPTIVE NEURAL FUZZY INFERENCE SYSTEM (ANFIS) BASED INTELLIGENT CONTROLLER SCHEME AND DEVICE

FIELD OF THE INVENTION

The invention presents a three layer cascade adaptive neural fuzzy inference system (ANFIS) based intelligent controller scheme and device for the mobile wireless network to optimize the maximum average throughput, minimum transmit power and interference for multimedia call services. The three layer cascade architecture mainly contains an ANFIS rate controller (ARC) in the first layer, an ANFIS power controller (APC) in the second layer and an ANFIS interference controller (AIC) in the third layer. The invention is proposed to maximize the average throughput of the mobile wireless network, while minimizing the transmit power and interference power.

BACKGROUND OF THE INVENTION

Currently, the general radio resource management of wireless multimedia communication network mainly contains the channel and transmit power assignments, which are stated hereinafter.

A previous study has proposed an adaptive neural fuzzy inference system (ANFIS)-assisted power control scheme for a multi-rate multimedia direct-sequence code-division multiple-access (DS-CDMA) system to precisely predict the channel variations and thus compensate for the effect of signal fading in advance [1]. The author in the above study also provides a procedure for determining the transmission rate based upon the output of the signal-to-interference and noise ratio (SINR) increment of the ANFIS power control mechanisms at the sample period. The fuzzy membership functions of ANFIS power control mechanisms use seven Gaussian functions, so that there are 49 fuzzy inference rules. The ANFIS power control mechanisms use two input variables, including SINR error e(n) and SINR error change Δe(n), to track the set point of target SINR. In the present technique, the target SINR value is set to a fix value of 1.5 dB, let the power control process is not flexible enough. The input parameters of ANFIS power control mechanism totally depend on SINR control efficiency. The power cannot be controlled by channel environment and user speed change. The technology has not considered network traffic performance and user speed. According to the method used in another study [2], the neural fuzzy call-admission and rate controller (NFCRC) takes the handoff failure probability and the resource availability of the selected cell as input variables of the ANFIS to guarantee the QoS requirement of handoff failure probability for all traffic loads, but the new call blocking probability is higher than 0.05. The buffer size in the given cell is assumed to be three for new and handoff calls so that the system can wait for the channel to become available before dropping the call

[1] C. H. Jiang, J. K. Lian, R. M. Weng, C. H. Hsu, "Multi-rate DS-CDMA with ANFIS-assisted power control for wireless multi-media communications," International Journal of Innovative Computing, Information and Control, vol. 6, no. 8, pp. 3641-3655, August 2010.

[2] K. R. LO, C. J. Chang, C. B. Shung, "A neural fuzzy resource manager for hierarchical cellular systems supporting multimedia services," IEEE Trans. on Vehicular Tech., vol. 52, no. 5, pp. 1196-1206, September 2003.

SUMMARY OF THE INVENTION

In view of the disadvantages of prior art, the primary object of the present invention is to provide a three layer cascade adaptive neural fuzzy inference system (ANFIS) [3] based intelligent controller scheme and device for mobile wireless network. The principal object of the present invention is that it can autonomously control the assignments of transmission data rate, transmit power and antenna null according to the measured network traffic performance, traffic load, user speed, inter-cell interference power, bit error rate (BER) and signal-to-interference-and-noise ratio (SINR) of the transceiver, so that the mobile wireless network can produce the maximum average throughput, minimum transmit power and interference for multimedia services. The present invention uses ANFIS architecture to adapt the data rate assignment to the traffic load, user speed and requested bandwidth of multimedia call services; to adapt the transmit power assignment to the BER, SINR and user speed; to adapt the null width and depth to the interference. The proposed intelligent controller is designed to efficiently manage the networks spectrum and power resources for multimedia mobile wireless communication networks.

[3] Jyh-Shing Roger Jang, "ANFIS: Adaptive-Network-Based Fuzzy Inference System", IEEE Transaction on System, Man, and Cybernetics, Vol. 23, NO. 3, June 1993.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 13(A) shows number of nulls of ANFIS interference controller for different $SINR_i$.

FIG. 13(B) shows $SINR_o$ of ANFIS interference controller for different $SINR_i$.

FIGS. 14(A) to (C) show initial membership functions of ANFIS interference controller.

FIGS. 15(A) to (C) show learned membership functions of ANFIS interference controller.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
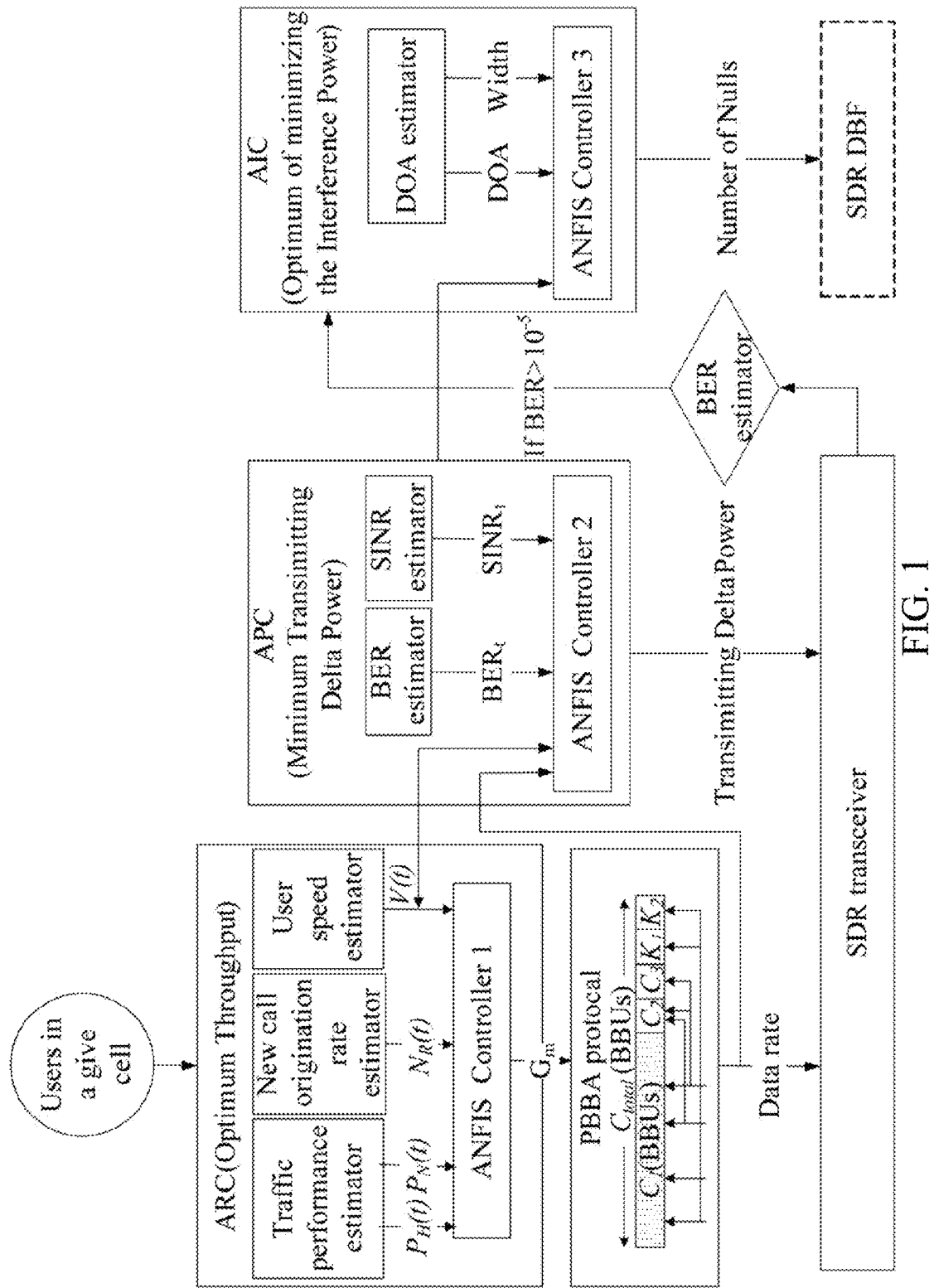
FIG. 1 is a block diagram of the three layer cascade ANFIS controller for the multimedia mobile wireless communication networks.

The principal structure of the present invention is a three layer cascade controller as shown in FIG. 1; its architecture is divided into three layers, namely an ANFIS rate controller (ARC) in the first layer, which consists of ANFIS controller 1, traffic performance estimator, new call origination rate estimator and user speed estimator; an ANFIS power controller (APC) in the second layer, which consists of ANFIS controller 2, BER estimator and SINR estimator; and an ANFIS interference controller (AIC) in the third layer, which consists of ANFIS controller 3 and DOA estimator. The design of three layer cascade controller contains network layer and physical layer. In order to complete the intelligent allocation of network resources, the present invention is to use adaptive network architecture established by Jjh Shing Roger Jang in 1993, known as ANFIS [3], which is a fuzzy inference system. By using a hybrid learning method, the weights of ANFIS controller are adjusted to the appropriate value. When the new call generated into the ARC of the first network layer, the traffic performance estimator is used to estimate the network traffic performance, including new call generation probability and handoff failure probability, the new call originate rate estimator is used to estimate the traffic loads, and the speed estimator is used to estimate the user speed. The ARC adapts the data rate assignment to the changing traffic load and user speed. In addition, the ARC combined with PBBA protocol is able to maintain new call blocking probability and handoff failure probability of the mobile wireless network below a prescribed low level under different user speeds and high new call originate rate while maximizing average throughput. In the second part of the physical layer, the BER estimator and SINR estimator of the APC can estimate the BER and the SINR, respectively. The APC will be coordinated with ARC to set the data rate for the transceiver, which switches to the corresponding modulation mode and coding rate. The APC accepts four inputs namely user speed, data rate, transceiver BER and SINR and generates the optimization of minimum transmit power. The APC will continue to estimate the SINR value. The transmit power of transceiver remains unchanged if the SINR is less than the threshold; the transmit power of transceiver will increases with the interference power to maintain the BER less than $10^{-5}$ if the transmit power is less than the upper bound of transmit power; the AIC in the third layer is initiated to reject the interference if the transmit power reaches the upper bound of transmit power. In the AIC, the DOA estimator measures the DOA of interference source and angular spread. Based on the SINR generated from the APC, three AIC inputs including the interference DOA, angular spread and SINR are used by ANFIS controller to assign the optimum number of nulls for the software-defined radio (SDR) digital beamformer (DBF) to achieve the goal of minimizing the residual interference in order to control the BER level of receiver below $10^{-5}$.

Figure 2:
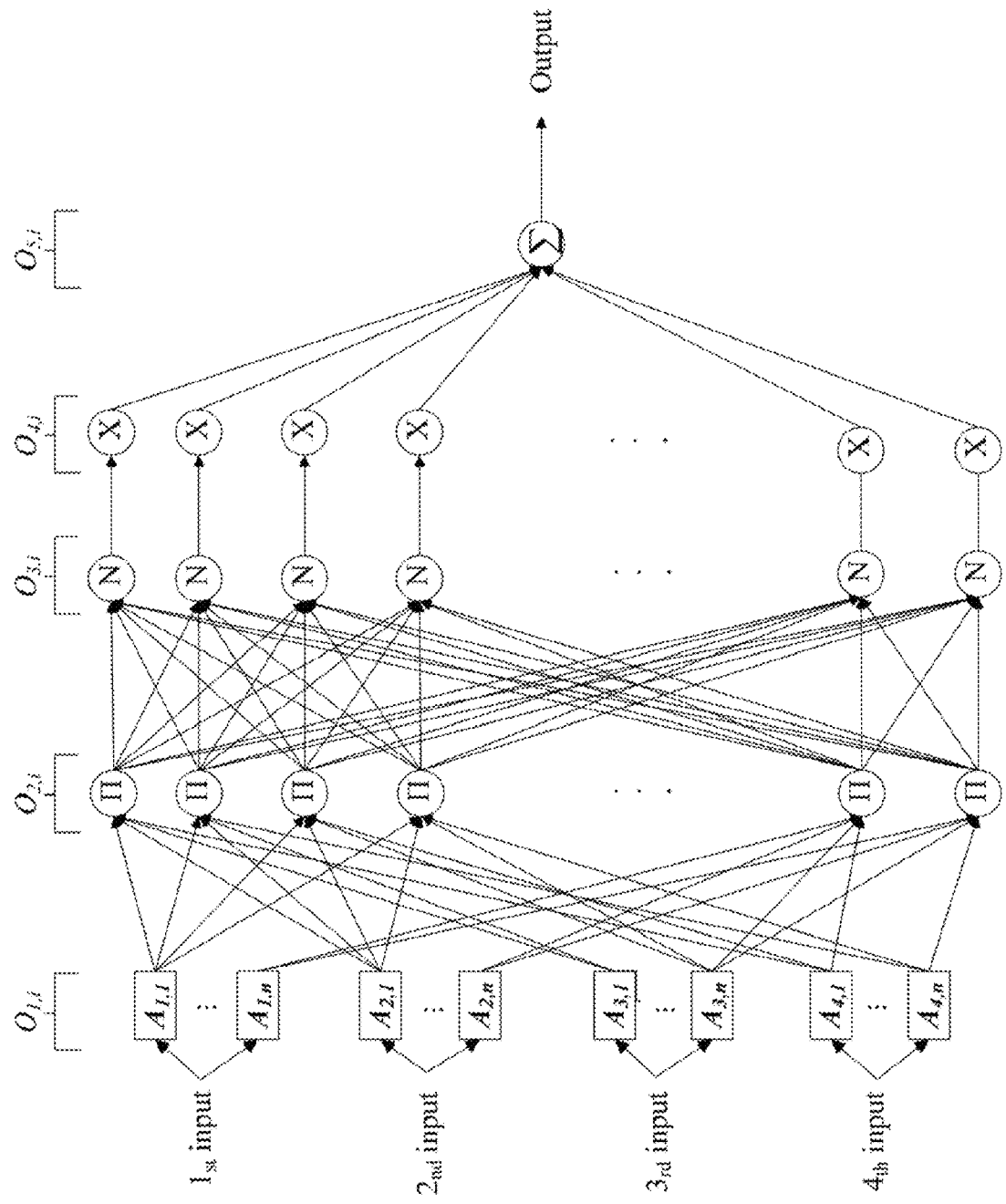
FIG. 2 shows the architecture of ANFIS controller.

The architecture diagram of ANFIS controller in the ARC is shown in FIG. 2, which contains five tiers, a total of four inputs and one output. The new call blocking probability, handoff failure probability, new call generation rate and user speed are the inputs of the ARC and the data rate is the output of the ARC; For the APC, the inputs of the ANTIS controller are the user speed, data rate, transceiver BER and SINR and its output is the change amount of the transmit power; the ANFIS controller architecture of the AIC is similar with the ARC and APC, but instead of three inputs and one output, its inputs are the angular spread, SINR and interference DOA and its output is the optimum number of nulls. The ANFIS controller of the ARC is used as an example to describe its framework:

Layer 1: The Gaussian membership functions are defined as $$A_{j,l}(x_{j,m}) = e^{\frac{-(x_{j,m}-b_{j,l})^2}{2a_{j,l}^2}}, \text{ for } l = 1, 2 \text{ and } j = 1, 2, 3, 4 \quad (1)$$

where $x_{j,m}$ is the $m_{th}$ input and the premise parameters $a_{j,l}$ and $b_{j,l}$ pertaining to the node outputs are updated according to given training data and the steepest descent approach.

Layer 2: The output of node i, denoted by $O_{2,i}$, is the product of all the incoming signals for the ith rule. It is given by $$w_{i,m} = O_{2,i} = A_{1,p}(x_{1,m}) \times A_{2,q}(x_{2,m}) \times A_{3,r}(x_{3,m}) \times A_{4,s}(x_{4,m})$$

for $i=1,2\ldots,16; p=1,2; q=1,2; r=1,2; s=1,2.$ (2)

Layer 3: The output of node i, denoted by $O_{3,i}$, is called the normalized firing strength and calculated as $$O_{3,i} = \hat{w}_{i,m} = \frac{w_{i,m}}{\sum_{i=1}^{16} w_{i,m}}, \text{ for } i = 1 \sim 16. \quad (3)$$

Layer 4: Every node in the fourth layer is an adaptive node with a node function $$O_{4,i} = \hat{w}_{i,m} \times f_{i,m} = \hat{w}_{i,m} \times (\alpha_i x_{1,m} + \beta_i x_{2,m} + \gamma_i x_{3,m} + \lambda_i x_{4,m} + \sigma_i); \text{ for } i=1\sim16, \quad (4)$$

where $O_{4,i}$ is the node output, $f_{i,k}$ is a crisp output in the consequence, and the $\alpha_i$, $\beta_i$, $\gamma_i$, $\sigma_i$, $\lambda_i$ are the consequent parameters of node i. The 16 fuzzy inference rules of $f_{i,m}$ corresponding to FIG. 2 are constructed as follows:

$R_1$: If ($x_{1,m}$ is $A_{11}$) and ($x_{2,m}$ is $A_{21}$) and ($x_{3,m}$ is $A_{31}$) and ($x_{4,m}$ is $A_{41}$) then (output is $f_{1,m}$)
$R_2$: If ($x_{1,m}$ is $A_{11}$) and ($x_{2,m}$ is $A_{22}$) and ($x_{3,m}$ is $A_{31}$) and ($x_{4,m}$ is $A_{41}$) then (output is $f_{2,m}$)
$R_3$ ($x_{1,m}$ is $A_{11}$) and ($x_{2,m}$ is $A_{21}$) and ($x_{3,m}$ is $A_{32}$) and ($x_{4,m}$ is $A_{41}$) then (output is $f_{3,m}$)
⋮ (5)
$R_{15}$: If ($x_{1,m}$ is $A_{11}$) and ($x_{2,m}$ is $A_{21}$) and ($x_{3,m}$ is $A_{32}$) and ($x_{4,m}$ is $A_{42}$) then (output is $f_{15,m}$)
$R_{16}$: If ($x_{1,m}$ is $A_{11}$) and ($x_{2,m}$ s $A_{22}$) and ($x_{3,m}$ is $A_{32}$) and ($x_{4,m}$ is $A_{42}$) then (output is $f_{16,m}$)

The above 16 fuzzy inference rules are used for determining the assigned data rate to achieve optimization objective.

Layer 5: The single node in the fifth layer is a fixed node labeled Σ, which computes the overall output $O_5$ as the summation of all incoming signals.

$$G_m = O_5 = \sum_{i=1}^{16} \hat{w}_{i,m} \times f_{i,m} \quad (6)$$

(A) ARC: This invention presents the simulation scenarios of multimedia mobile wireless network, which provides four types of multimedia call services including unsolicited grant service (UGS), best effort (BE), non-real-time polling service (nrtPS), real-time polling service (rtPS), which are assigned with $D_1$, $D_2$, $D_3$, $D_4$ equivalent BBUs, respectively. A two contiguous-cell mobile wireless network with total number of basic bandwidth units (BBUs) constraint $C_{total}$ for each cell is considered. The ARC employs six types of data rates, as shown in TABLE 1, to control the modulation type and channel coding rate of the transceiver in the PHY-layer. One BBU equals the data rate of 64 kbps (VoIP applications require 64 kbps). The performance parameters of mobile wireless network are listed in Table 2. The system parameters are described as follows. The maximum number of users is assumed to be 40, which should be less than the number of data sub-carriers in the Mobile wireless OFDM system. The cell radius r is assumed to be 2 km. UGS is designed for voice call services requiring a fixed packet interval and fixed packet size such as VoIP application. Both $D_1$ and $D_2$ require one equivalent BBU (64 Kbps) for UGS voice call and BE data call services, respectively, $D_3$ requires two equivalent BBUs (128 Kbps) for nrtPS data call service and $D_4$ requires three equivalent BBUs (192 Kbps) for rtPS data call service. UGS voice call service in the mobile wireless network corresponds to a constant bit rate (CBR) in asynchronous transfer mode (ATM). Other rtPS, nrtPS and BE in the mobile wireless network are data call services, all of which can be applied to wireless applications just as they are in wire line applications. The handoff rates for new calls and handoff calls are evaluated using the mobility model. The new call requests are generated according to the Poisson process with a mean new call origination rate (calls/sec) for four different multimedia call services and are assumed to be uniformly distributed in each cell. The interval between two call arrivals is 0.01 s. The range of new call origination rate varied from 0.02 to 0.18 and was divided into 10 different new call origination rates. Five cases of user speeds including 20 km/h, 40 km/h, 60 km/h, 80 km/h and 100 km/h are set to simulate the traffic performance for the 10 new call origination rates. A total of 50 different external environment conditions are considered. The call holding time is exponentially distributed with different means for different types of multimedia service calls. The mean call holding time for UGS is 120 s and the mean call holding time for BE, nrtPS and rtPS is 300 sec. The total number of the users in a given cell is set as 40, which is less than the number of data sub-carriers defined in a 128-FFT OFDMA system.

TABLE 1

| modulation (code rate) | Data rate(kbps) | Equivalent Basic Bandwidth Units |
|---|---|---|
| QPSK(1/2) | 64 | 1 BBUs |
| QPSK(1/2) | 128 | 2 BBUs |
| QPSK(3/4) | 192 | 3 BBUs |
| 16QAM(1/2) | 256 | 4 BBUs |
| 16QAM(3/4) | 384 | 6 BBUs |
| 64QAM(2/3) | 512 | 8 BBUs |

TABLE 2

| | |
|---|---|
| New call generation rate (calls/sec) (Poission distribution) | 0.02~0.2 |
| Coverage radius (km) | 2 |
| Types of average user speed (km/hr) | 20 km/hr, 40 km/hr, 60 km/hr, 80 km/hr, 100 km/hr |
| Types of multimedia services | 4 Types (UGS, BE, nrtPS, rtPS) |
| Call rate | $D_1:D_2:D_3:D_4 = 1:1:1:1$ |
| System capacity | 40 equivalent Basic Bandwidth Units (1 BBU = 64 Kbps) |
| Multiple access method | OFDMA |
| Number of subcarriers | 128 |

Figure 3:
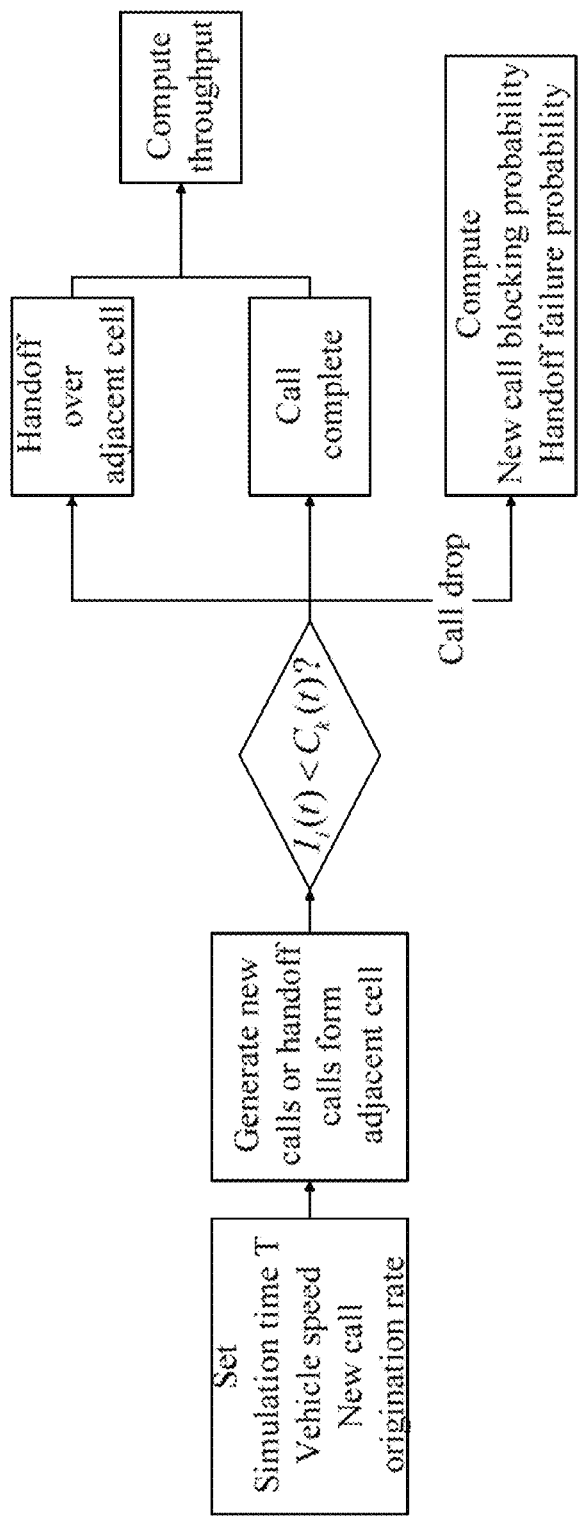
FIG. 3 illustrates the flow chart of ANFIS rate controller.

In a mobile wireless network, the new call blocking probability is an important QoS parameter, which denotes the likelihood of a new connection request being denied to enter the network. A similar situation arises when an established connection in one cell attempts to migrate into a neighborhood cell (i.e., a hand-off is attempted). If the neighborhood cell cannot support the channel resources required by the connection, the handoff call is denied and the connection is dropped. The handoff failure probability expresses the likelihood of an existing connection being forcibly terminated during a call handoff between cells due to a lack of channel resources in the target cell. The average throughput is defined as the total data rates assigned to each new generation call and the handoff call in a given cell. The new call blocking probabilities and handoff failure probabilities of a mobile wireless network are defined as $$P_N = \frac{\sum_{t=0}^{T} N_{NB}(t)}{\sum_{t=0}^{T} N_N(t)} \quad (7)$$

$$P_H = \frac{\sum_{t=0}^{T} H_F(t)}{\sum_{t=0}^{T} N_H(t)}, \quad (8)$$

where $N_{NB}(t)$ is the number of blocked new calls at time t; $N_N(t)$ is the number of new calls at time t and T is the total simulation time. The average throughput of the mobile wireless network is defined as $$R = \frac{64 \times \left(\sum_{u=1}^{U} T_{Hx,k,u} G_u\right)}{T} \text{(kbps/sec)}, \quad (9)$$

where U is the total number of successfully completed calls served in a given cell within the duration of T sec. $T_{Hx,k}$ is the bandwidth holding time either for a new call or handoff call and $G_M$ is the assigned number of BBUs for the $u_{th}$ successful new generation calls or handoff calls. In the preset total simulation time T, the average throughput R can be calculated by (9). FIG. 3 illustrates the flow chart of the ARC to simulate the new call blocking probability, handoff failure probability and average throughput of the mobile wireless network.

Figure 4:
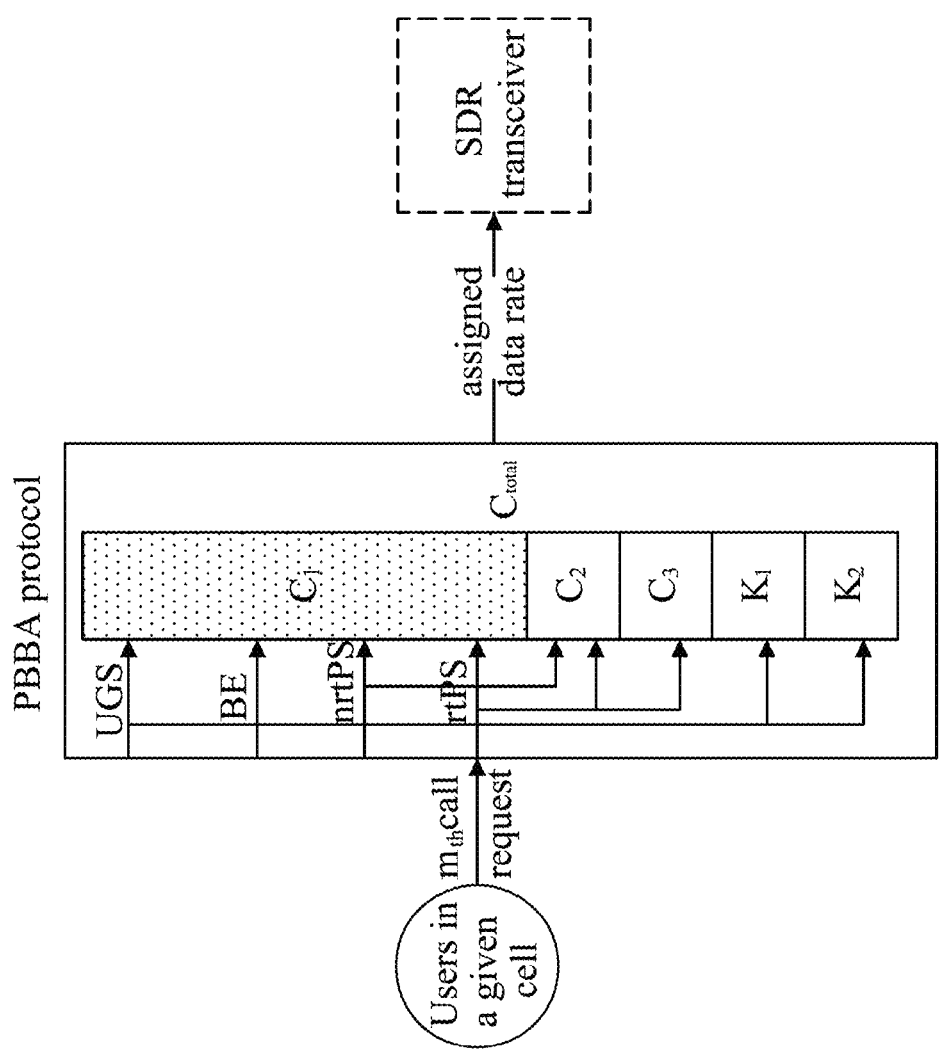
FIG. 4 shows PBBA protocol diagram.
Figure 5A:
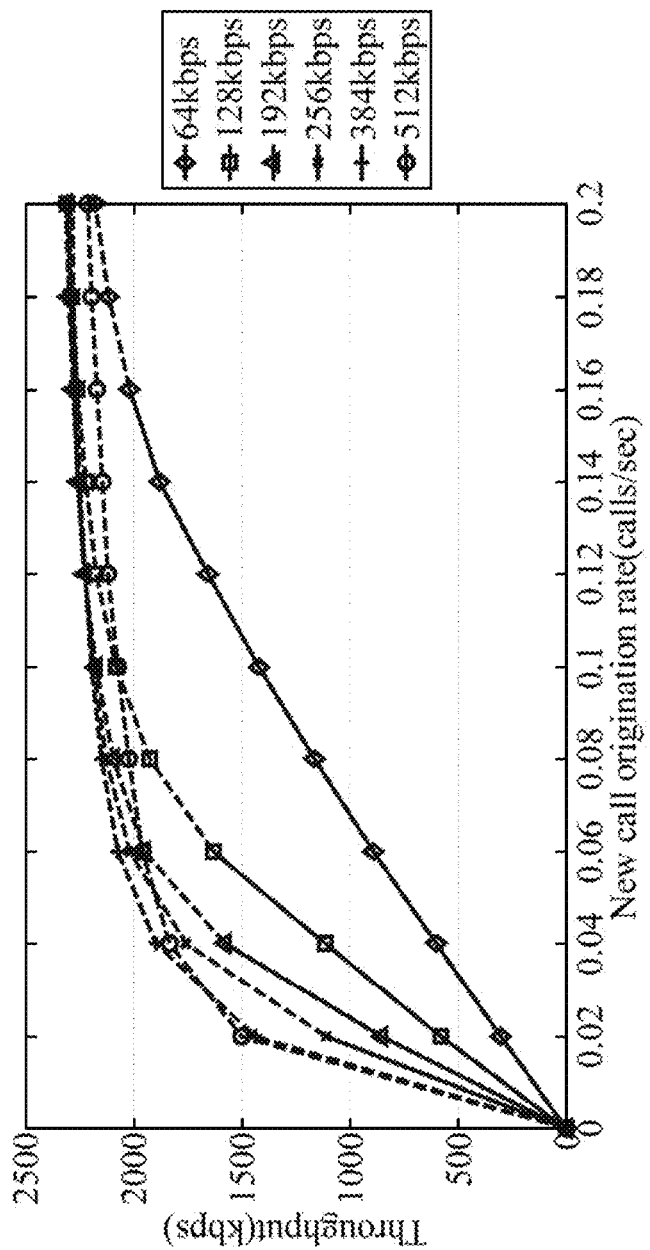
FIG. 5(A) illustrates average throughput for user speed of 20 Km/hr.
Figure 5B:
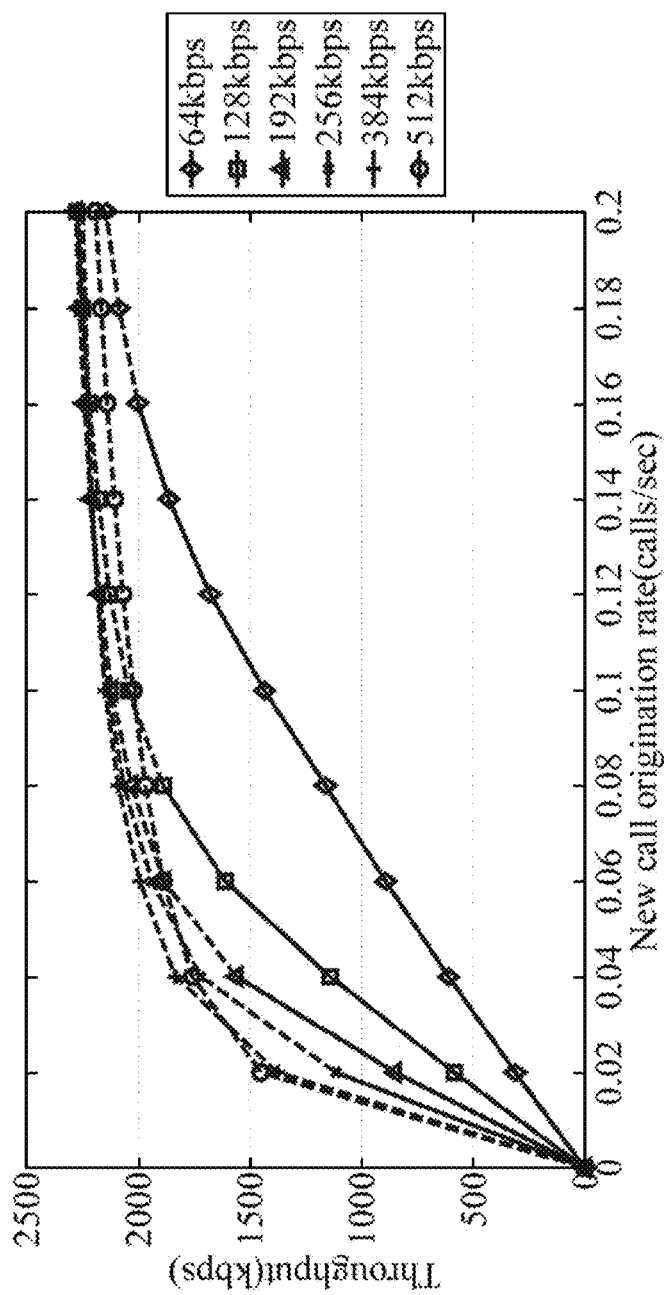
FIG. 5(B) illustrates average throughput for user speed of 40 Km/hr.
Figure 5C:
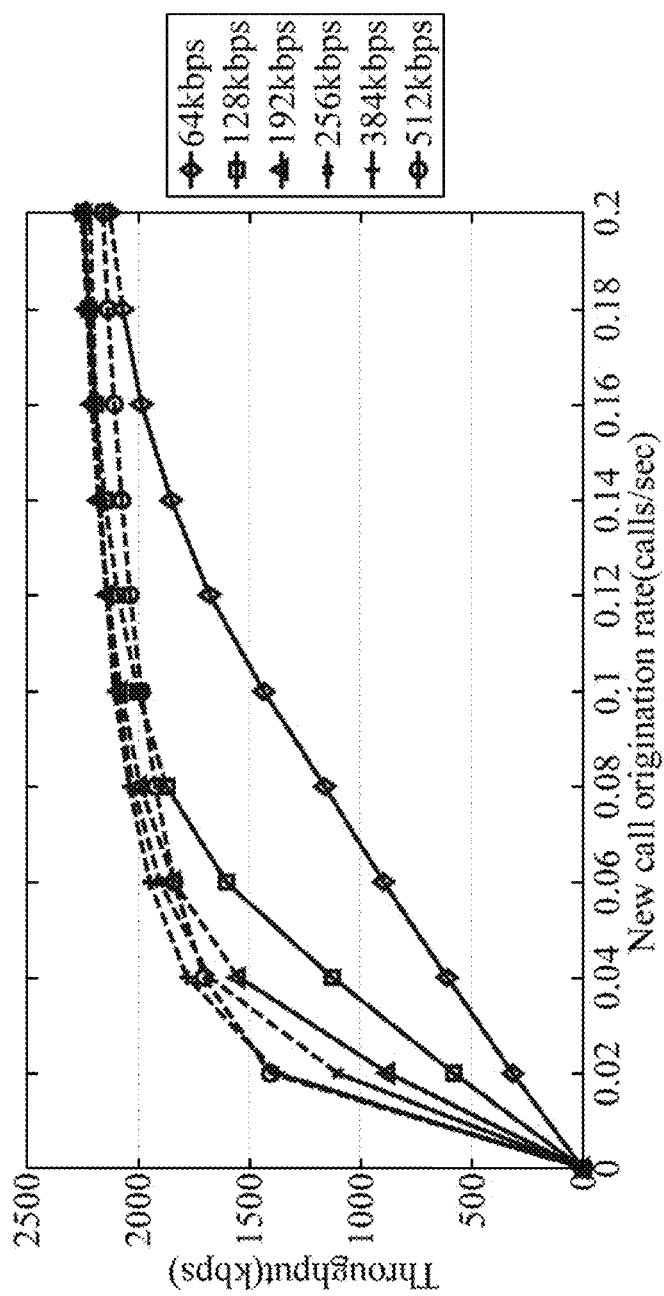
FIG. 5(C) illustrates average throughput for user speed of 60 Km/hr.
Figure 5D:
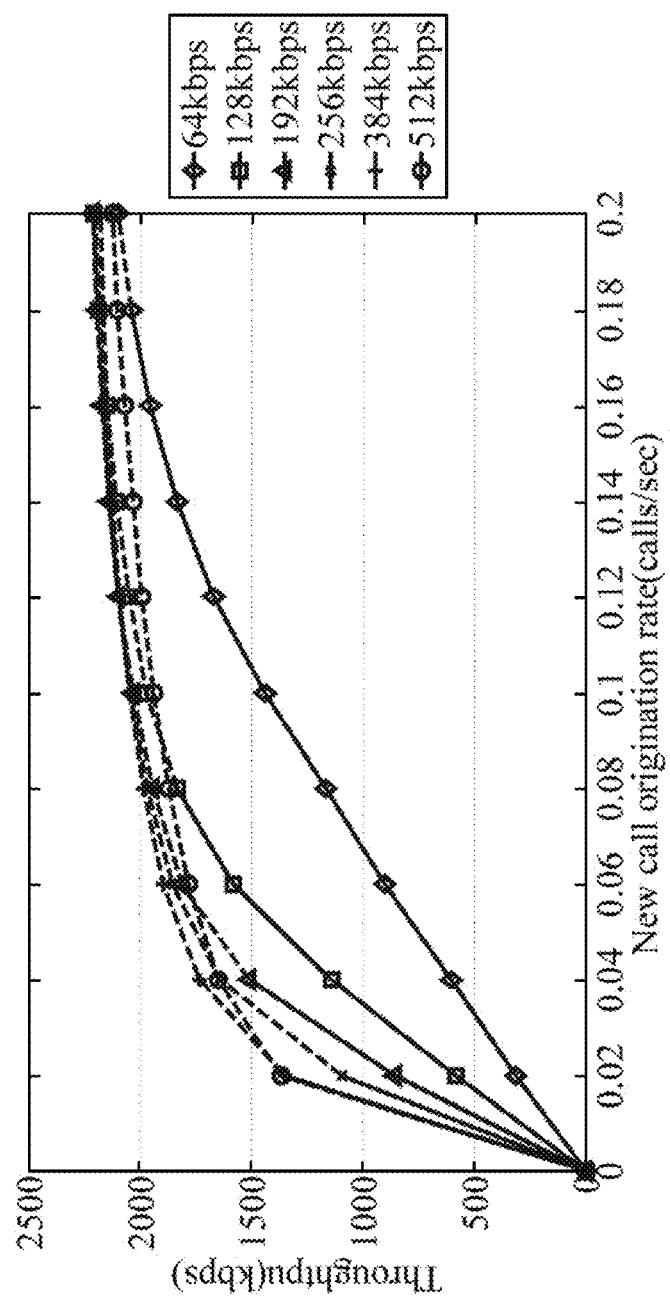
FIG. 5(D) illustrates average throughput for user speed of 80 Km/hr.
Figure 5E:
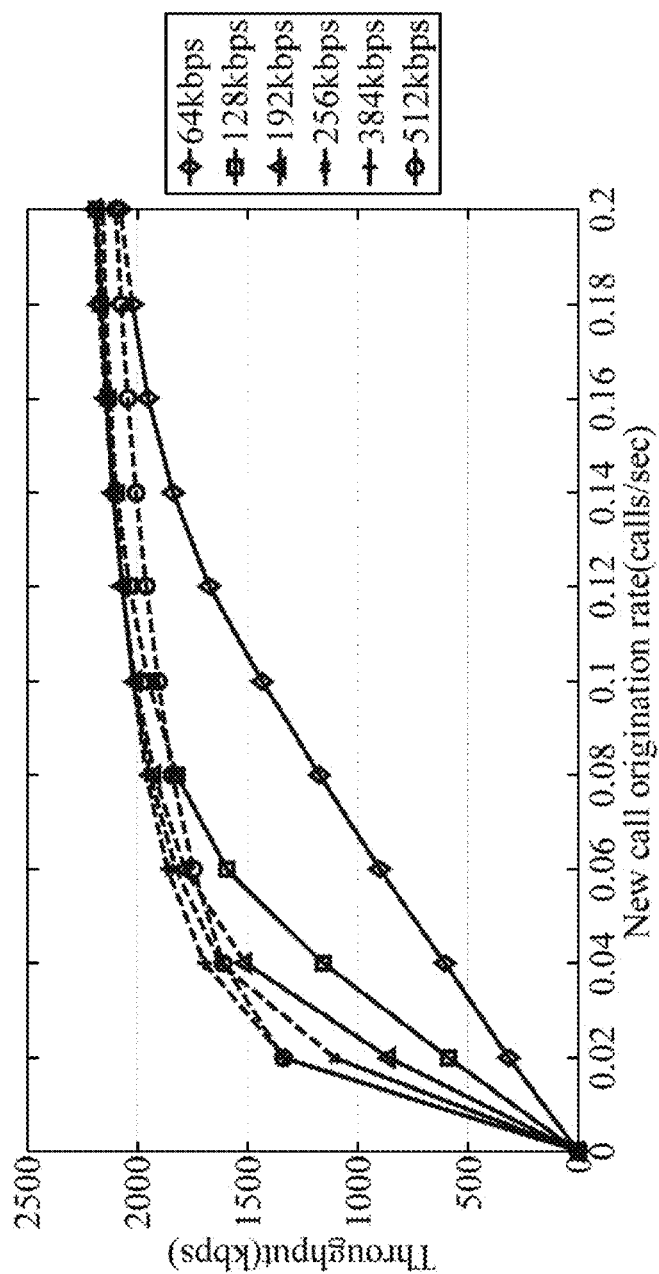
FIG. 5(E) illustrates average throughput for user speed of 100 Km/hr.

The priority-based bandwidth allocation (PBBA) protocol, which reserves more bandwidth resources for higher priority calls to satisfy the QoS requirement among different multimedia call services, is used to assign the data rate for the users of the mobile wireless network. The data rate assignment of the PBBA protocol only depends on the requested bandwidth of each multimedia call. As shown in FIG. 4, the PBBA protocol partitions the total system bandwidth in a given cell into one of five regions based on the call priority. The call priority is determined by the requested amount of bandwidth specified for different types of multimedia call services. All multimedia new and handoff calls can share the first region of $C_1$ BBUs using first-in-first-service protocol. The second region of $C_2$ BBUs is allocated for the first and second highest priority data calls, which are rtPS and nrtPS data calls. The third region of $C_3$ BBUs is allocated exclusively for the highest priority data call, which is the rtPS data call. Exploiting the PBBA protocol to protect the high priority data calls provides a balanced service performance for different multimedia call services. In general, a voice call has a higher priority than a data call and it cannot be interrupted once it is assigned with a channel. Therefore, in the proposed PBBA protocol, a new UGS voice call can use the allocated bandwidth in the regions of $(C_1+K_1)$ BBUs and a handoff UGS voice call can use the allocated bandwidth in the regions of $(C_1+K_2)$ BBUs. The total number of equivalent BBUs assigned in a given cell is given by $$C_{total} = \sum_{k=1}^{3} C_k + K_1 + K_2, \quad (10)$$

where $K_1$ and $K_2$ are the number of reserved BBUs for new UGS voice calls and handoff UGS voice calls in regions 4 and 5, respectively. The bandwidth allocated in the $k_{th}$ region is $$C_k = D_k - D_{k-1}, k=2,3. \quad (11)$$

In the PBBA protocol, we assumed five types of priority factors for multimedia call services. The call priority is determined by the total number of BBUs defined by the priority factor. When the total number of BBUs in the priority factor is large, the order of the call priority is low. A new call will be generated in a given cell if the total available bandwidth of the base station (BS) is greater than or equal to the bandwidth threshold. The new UGS voice call bandwidth threshold is given by $$Q_{v,n} = D_1 + P_{v,n}, \quad (12)$$

where the priority factor of the new UGS voice call, denoted by $P_{v,n}$, is defined as $$P_{v,n} = C_2 + C_3 + K_2. \quad (13)$$

For the handoff UGS voice call, the bandwidth threshold is given by $$Q_{v,h} = D_1 + P_{v,h}, \quad (14)$$

where the priority factor of the handoff UGS voice call, denoted by $P_{v,h}$, is defined as $$P_{v,h} = C_2 + C_3 + K_1. \quad (15)$$

The bandwidth thresholds of the BE, rtPS and nrtPS data calls are given by $$Q_{d,k} = D_k + P_{d,k}, k=2,3,4, \quad (16)$$

where $P_{d,2}$, $P_{d,3}$, $P_{d,4}$ denote the priority factors of the BE, rtPS and nrtPS data calls, respectively.

$$P_{d,k} = C_{total} - \sum_{i=2}^{k} C_{i-1}, k = 2, 3, 4. \quad (17)$$

When the ARC is combined with the PBBA protocol, the data rate is intelligently assigned to the SDR transceiver based upon the user's call request, user speed and traffic performance of the mobile wireless network. For example, if the $m_{th}$ ARC output $G_m$, is equal to 4 BBUs, it corresponds to assigning one BBU for UGS voice call or four BBUs for any of BE, nrtPS and rtPS data calls, respectively. Therefore, in the proposed PBBA-ARC protocol, $D_1$ in (12) and (14) are replaced with $G_m$. The bandwidth thresholds of new and handoff UGS voice calls are given by $$Q_{nv,m} = G_m + P_{v,n}, \quad (18)$$

$$Q_{hv,m} + G_m + P_{v,h}. \quad (19)$$

$Q_{d,2}$, $Q_{d,3}$ and $Q_{d,4}$ represented in (16) for the bandwidth thresholds of data calls are changed as $$Q_{di,m} = G_m + P_{d,k}, k=2,3,4. \quad (20)$$

Without any loss of generality, an average throughput (R) maximization problem of the ARC is formally formulated as follows:

Maximize $R = f(\vec{x})$, $f(\vec{x})$ is the objective function; (21)

subject to $G(\vec{x}_m) \leq C_{total}$ BBUs

-continued $$G(\vec{x}_m) = \sum_{s=1}^{S_m} G_s(\vec{x}_m)$$

$G_s(\vec{x}_m) \in$

{1 BBUs, 2 BBUs, 3 BBUs, 4 BBUs, 6 BBUs, 8 BBUs}

$x_{1,m} \leq 0.05$ $x_{2,m} \leq 0.05$ $0.02 \leq x_{3,m} \leq 0.18$ 20 km/h $\leq x_{4,m} \leq$ 100 km/h, where the decision variables of the $m_{th}$ input data vector $\vec{x} = [x_{1,m}, x_{2,m}, x_{3,m}, x_{4,m}]^{transpose}$ are defined as $$x_{1,m} = P_{N,m}, x_{2,m} = P_{H,m}, x_{3,m} = NR_m, x_{4,m} = V_m. \quad (22)$$

Both the QoS and environmental parameters are sent to the ANFIS-ARC to train the controller to achieve the optimization objective. The target threshold of new call blocking probability and handoff probability is set as 0.05 to satisfy the QoS requirement of the different multimedia call services.

FIG. 5 shows an average throughput obtained from the simulation results for different data rates and external environment conditions. In FIG. 5, the solid curve part of the figure represents the average throughput achieved by the mobile wireless network, where both the new call blocking probability and handoff failure probability remain below 0.05. The maximum data rate is selected from the solid line part of the curves in order to increase the average throughput. The dotted line part of the curves in FIG. 5 denotes that either new call blocking probability or handoff failure probability is higher than 0.05. The lowest data rate is selected from the dotted line part of the curves to reduce the new call blocking probability and handoff failure probability. The proper data rate is selected to control the new call blocking probability and handoff failure probability below the predefined threshold of 0.05 while achieving maximum average throughput. Based on the above basic data rate selection rule, the fuzzy control rules in TABLE 3 are constructed using the simulation results shown in FIG. 5, where four input linguistic variables determine the data rate to achieve the optimization objective of maximum average throughput. When the value of $P_N$ is higher than 0.05, it is defined as high (H) and when the value is less than or equal to 0.05, it is defined as low (L). Similarly, when the value of $P_H$ is higher than 0.05, it is defined as high (H) and when the value is less than or equal to 0.05, it is defined as low (L). When the value of NR is higher than 0.04, it is defined as high (H) and when the NR value is less than or equal to 0.04, it is defined as low (L). When the value of V is greater than 60 km/h, it is defined as high (H) and when the value of V is less than or equal to 60 km/h, it is defined as low (L). As shown in TABLE 3, the sixteen combinations of input linguistic variables generate six different output data rates of the ARC. For control rule 1, when all four linguistic variables are L, the maximum data rate in the solid part of the curves in FIGS. 5(A), (B) and (C) is chosen as 384 kbps. For control rule 2, when NR, $P_N$, $P_H$ are L and V is H, the maximum data rate in the solid parts of the curves in FIGS. 5(D) and (E) is chosen as 512 kbps. For control rule 3, when V, $P_N$, $P_H$ are L and NR is H, the maximum data rate in the solid part of the curves in FIGS. 5(A), (B) and (C) is chosen as 128 kbps under the condition of achieving the optimization objective. For control rule 4, when $P_N$, $P_H$ are L and V, NR are H, the maximum data rate in the solid part of the curves in FIGS.

5(D) and (E) is chosen as 128 kbps. For control rule 5, when $P_H$, NR, V are L and $P_N$ is H, the minimum data rate in the dot parts of the curves in FIGS. 5(A), (B) and (C) is chosen as 192 kbps. For control rule 6, when $P_H$, NR are L and $P_N$, V are H, the minimum data rate in the dot parts of the curves in FIGS. 5(D) and (E) is chosen as 256 kbps under the condition closest to the optimization objective. The other control rules 7-16 are determined using a similar strategy described as in control rules 1-6.

TABLE 3

| | input ($x_{j,m}$) | | | | Desired output ($y_m$) |
|---|---|---|---|---|---|
| | $P_N$ | $P_H$ | NR | V | Data rate (kbps) |
| Rule1 | L | L | L | L | 384 |
| Rule2 | L | L | L | H | 512 |
| Rule3 | L | L | H | L | 128 |
| Rule4 | L | L | H | H | 128 |
| Rule5 | H | L | L | L | 192 |
| Rule6 | H | L | L | H | 256 |
| Rule7 | H | L | H | L | 64 |
| Rule8 | H | H | L | L | 192 |
| Rule9 | L | H | L | H | 256 |
| Rule10 | L | H | H | L | 64 |
| Rule11 | L | H | L | L | 192 |
| Rule12 | H | H | H | L | 64 |
| Rule13 | H | H | L | H | 256 |
| Rule14 | H | L | H | H | 64 |
| Rule15 | L | H | H | H | 64 |
| Rule16 | H | H | H | H | 64 |

Figure 6:
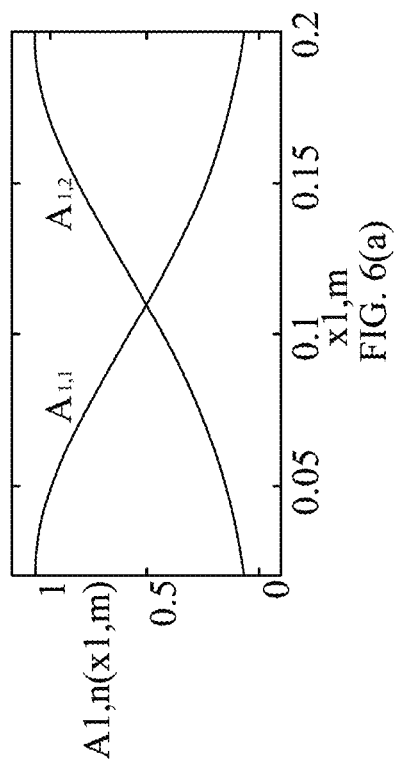
FIGS. 6(a) to (d) initial membership functions of ANFIS rate controller.
Figure 6:
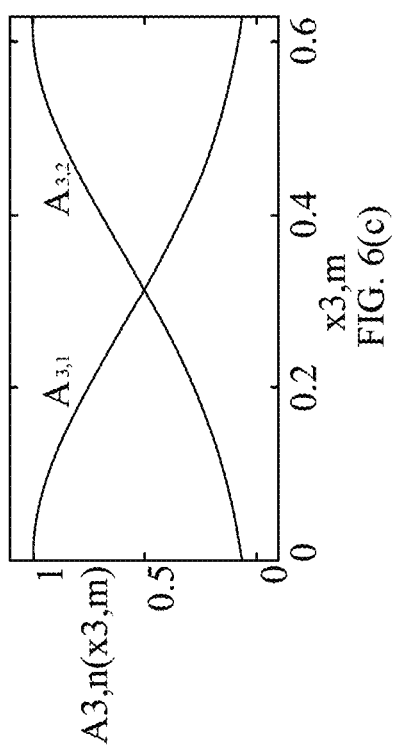
Figure 6:
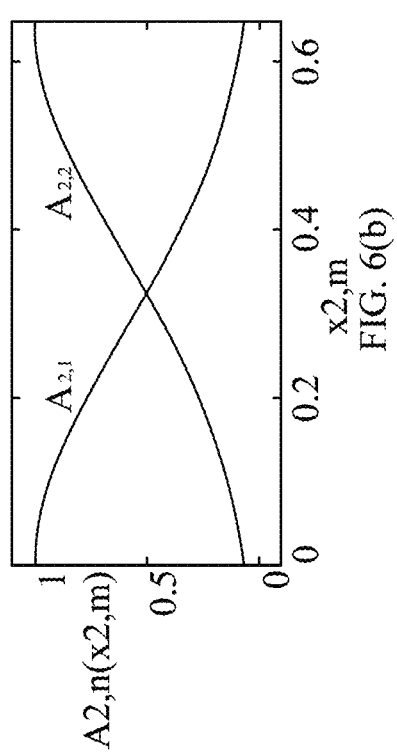
Figure 6:
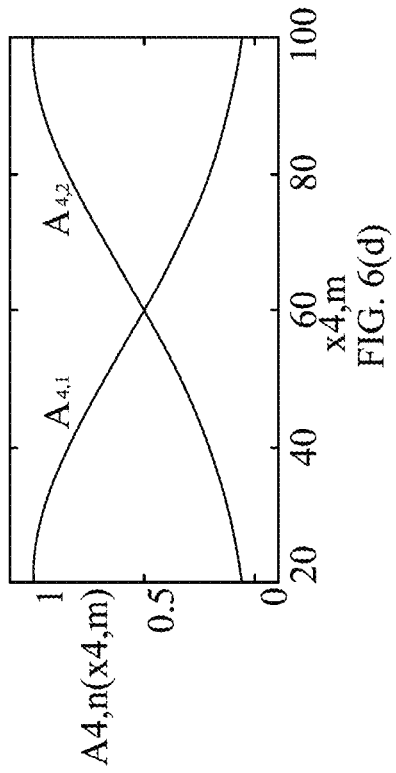
Figure 7:
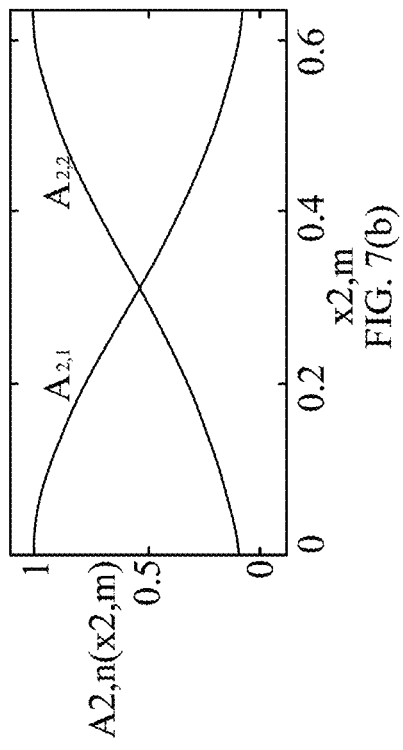
FIGS. 7(a) to (d) learned membership functions of ANFIS rate controller.
Figure 7:
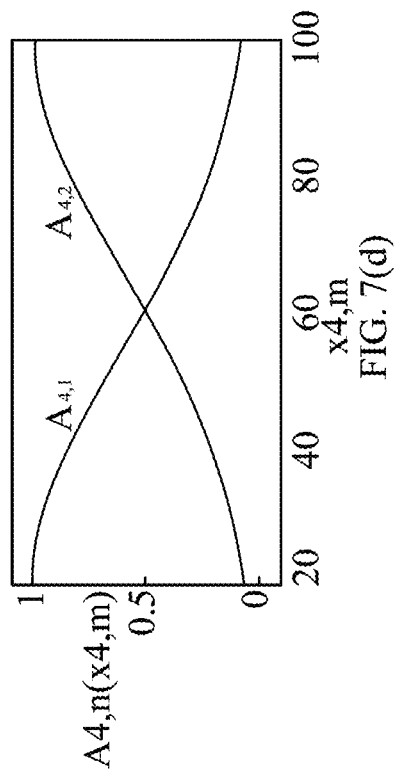
Figure 7:
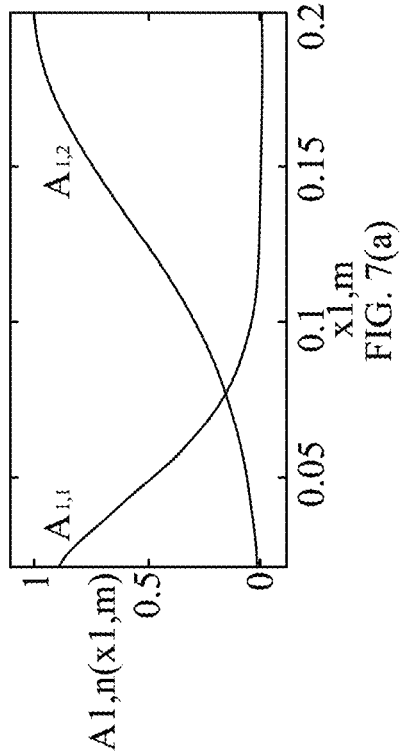
Figure 7:
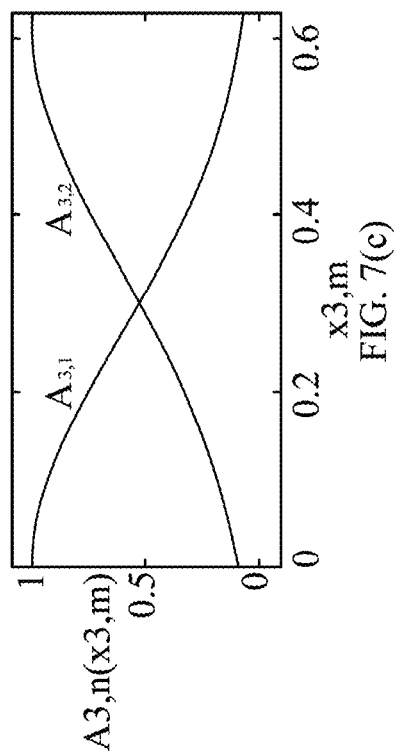
Figure 8:
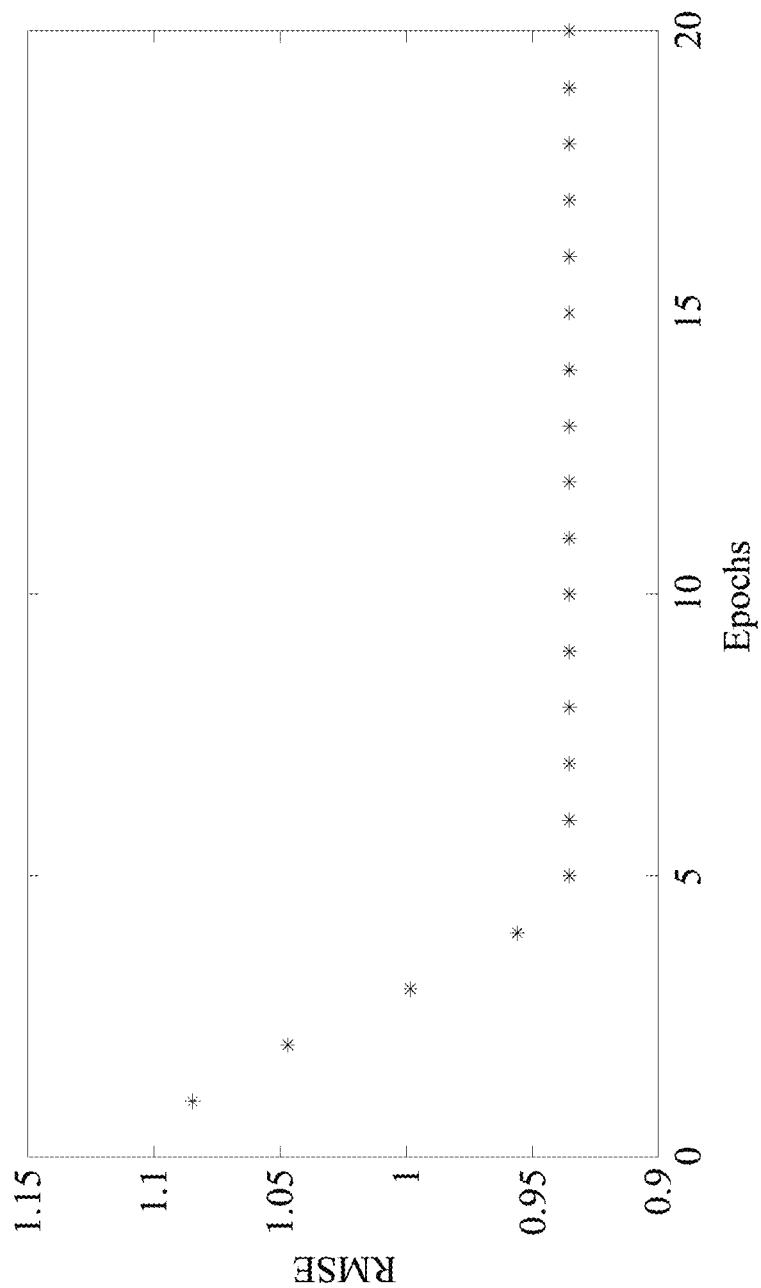
FIG. 8 illustrates root mean square error of ANFIS rate controller.
Figure 9A:
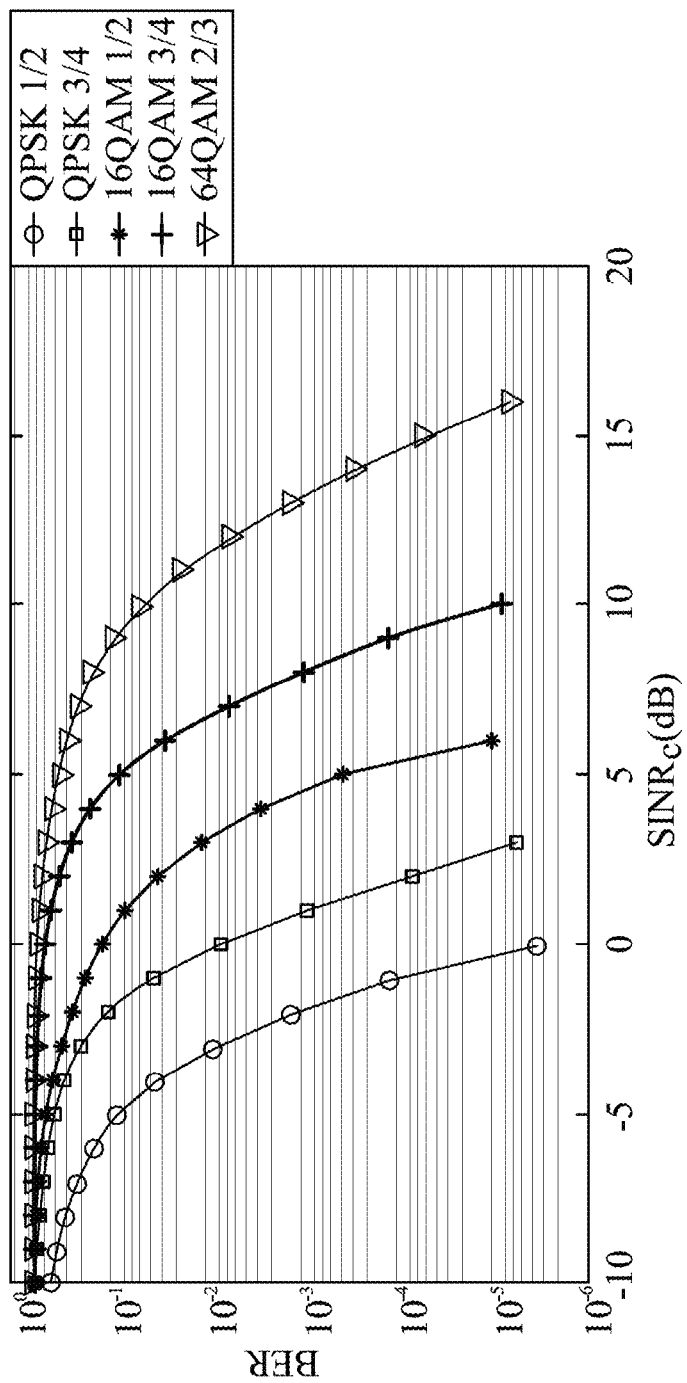
FIG. 9(A) illustrates the BER performance of transceiver over SUI-3 channel for user speed of 20 Km/hr.
Figure 9B:
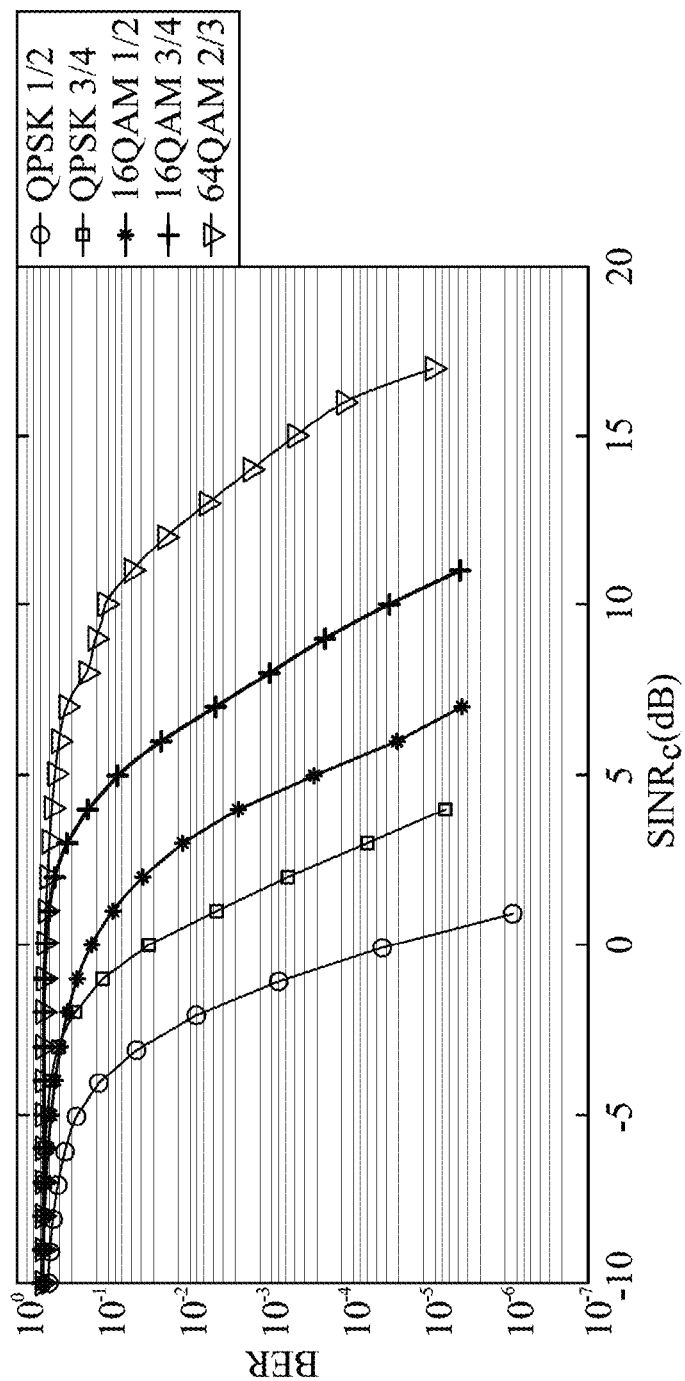
FIG. 9(B) illustrates the BER performance of transceiver over SUI-3 channel for user speed of 40 Km/hr.
Figure 9C:
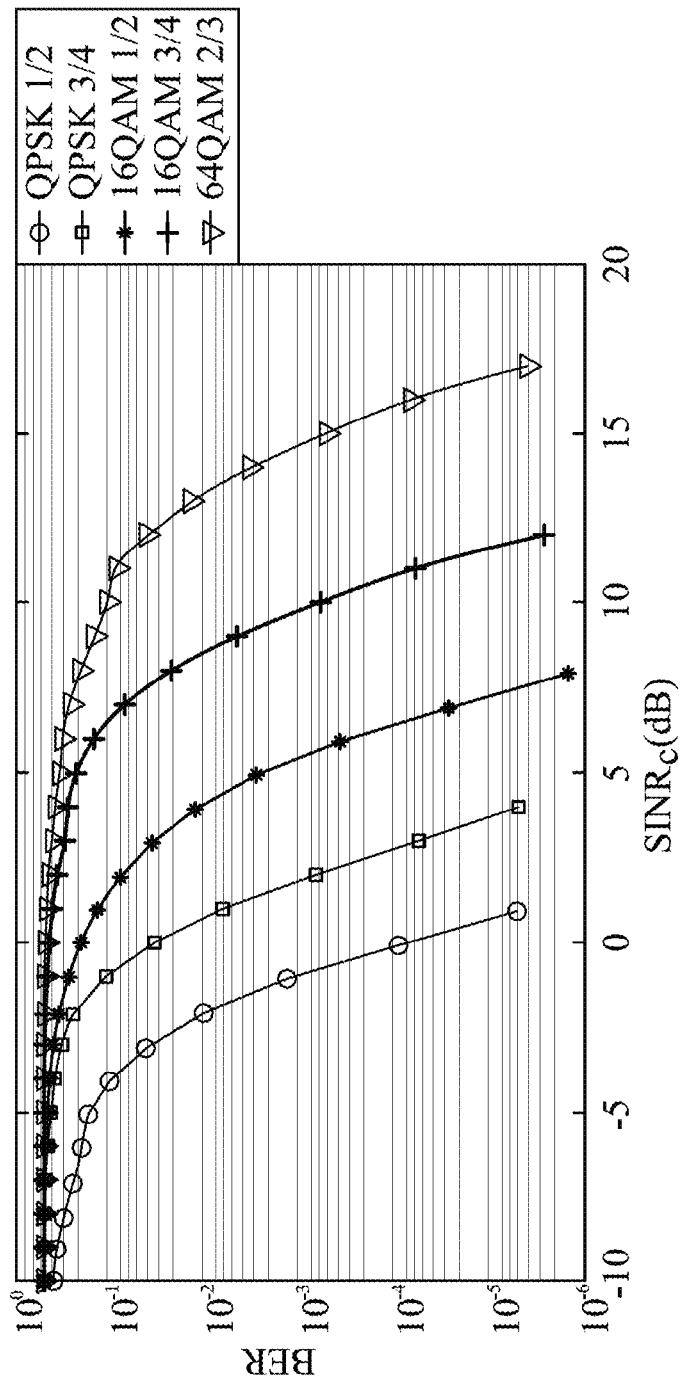
FIG. 9(C) illustrates the BER performance of transceiver over SUI-3 channel for user speed of 60 Km/hr.
Figure 9D:
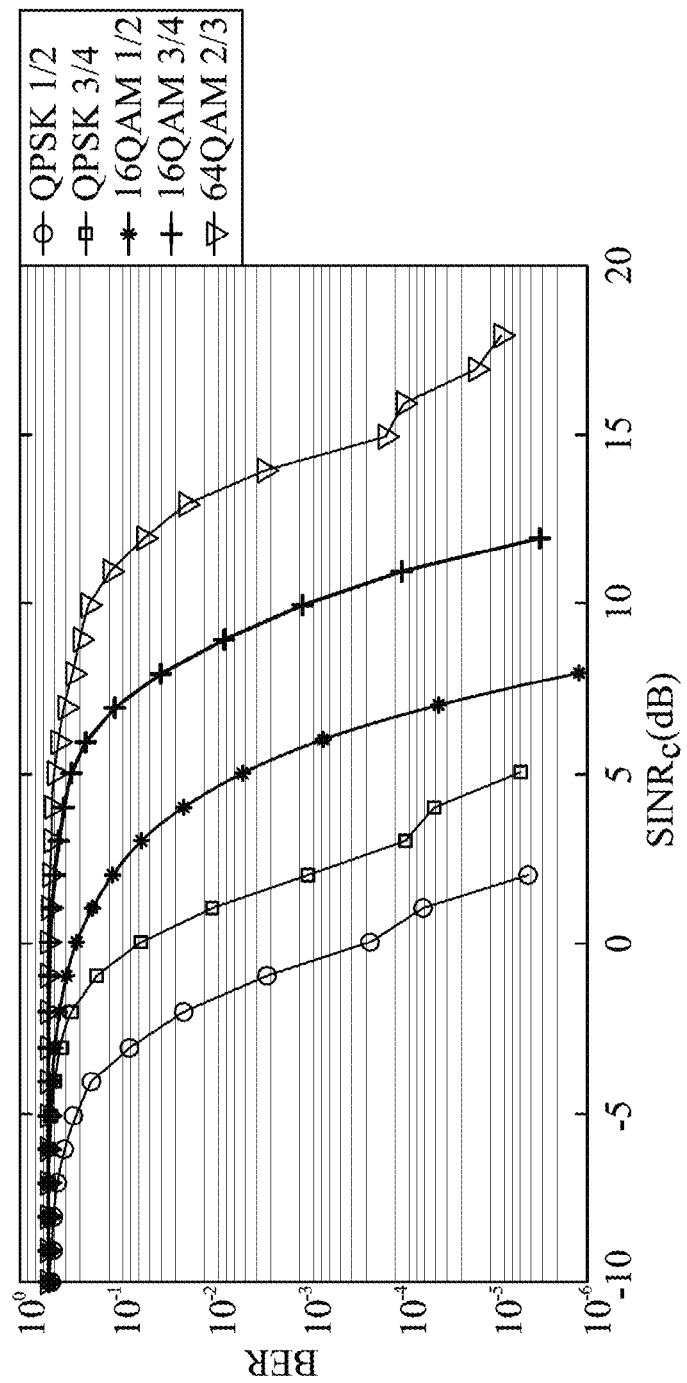
FIG. 9(D) illustrates the BER performance of transceiver over SUI-3 channel for user speed of 80 Km/hr.
Figure 9E:
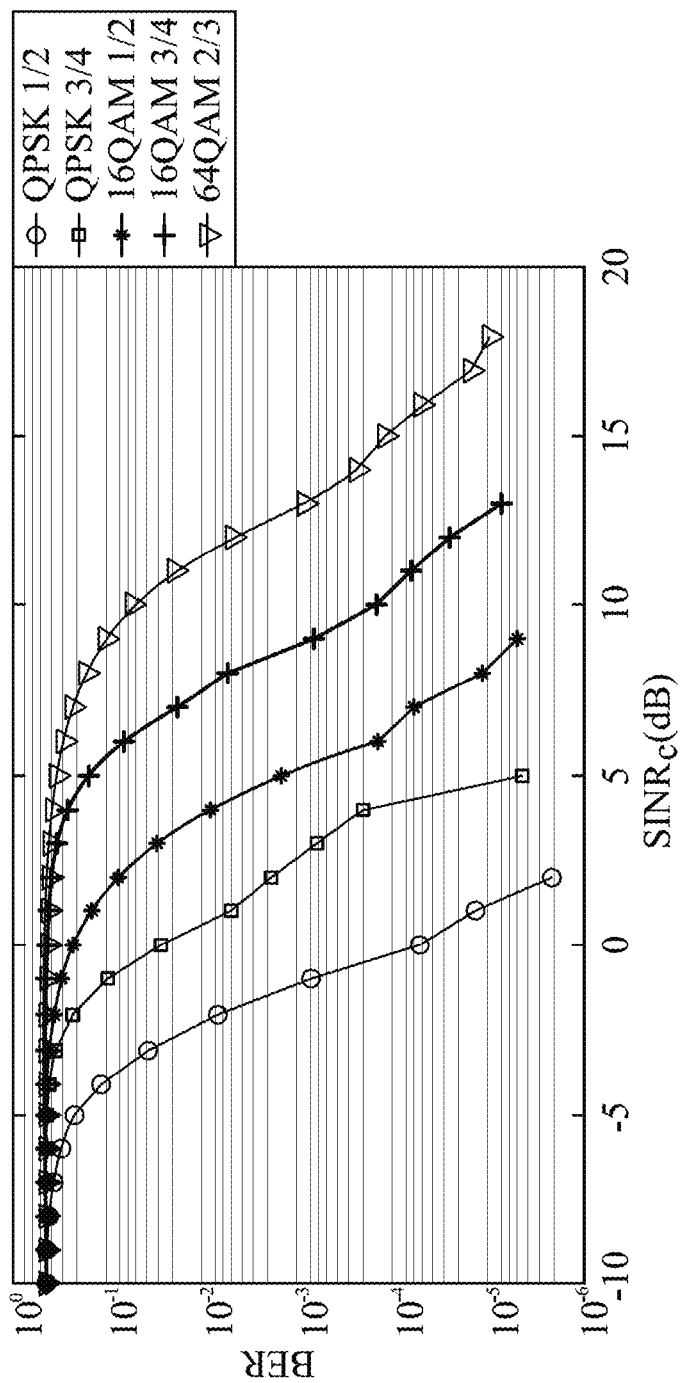
FIG. 9(E) illustrates the BER performance of transceiver over SUI-3 channel for user speed of 100 Km/hr.

The hybrid learning algorithm and the ANFIS control rules listed in TABLE 3 were used to estimate the premise and consequent parameters of the ARC through the two-step trainings. In the preliminary training, all four possible appropriate training data are input into the ARC. Eight Gaussian membership functions $A_{j,i}(x_{j,m})$ of the layer 1 are defined in (1), where the initial premise parameters are determined by the input training data. The values of training data $x_{j,m}$ are in the range of (20,100), (0.02, 0.18), (0, 0.6342) and (0, 0.6168) for j=1, 2, 3, 4, respectively. The minimum and maximum values of $x_{j,m}$ are used to set the initial values of $b_{j,1}$ and $b_{j,2}$. Then initial values of $a_{j,1}$ and $a_{j,2}$ are set by $a_{j,1} = a_{j,2} = (b_{j,1} - b_{j,2})/2.355$. The training data are discarded if the output error of the ARC is greater than the threshold. The threshold is set to 2 BBUs to reduce the output error. Only output error of the ANFIS-ARC below the threshold was sent to the ARC to perform the hybrid learning procedure repeatedly. The premise parameters of eight MFs before and after training are shown in FIG. 6 and FIG. 7, respectively. The root mean square error (RMSE) curve of the ARC is shown in FIG. 8, which demonstrates that the RMSE converges to 0.935411 after five epochs. The ARC has merit of being able to learn from the mobile wireless network using PBBA protocol operated under different traffic performance and environmental conditions. Finally, the appropriate data rate is determined by the ANFIS controller if the given requirement constraint is complied. The computational burden mainly causes from the offline traffic performance simulations pertaining to the construction of the training data. Once the initial learning of the ARC is finished using the collected training data to optimize network performance based on the 16 decision rules, the additional computation overhead in ANFIS controller is light. Since the operations of the ARC are executed in base station (BS), it is assumed that the computation ability of the BS is powerful enough to control the data rate for mobile wireless network. The information regarding the training data that governs the CR operation of a mobile wireless network is stored in a database. As soon as a new operation condition occurs, the new training data is generated from the simulation and included in the database to rerun the training procedure of FIG. 3.

(B) APC: In order to obtain minimum interference service in the multimedia mobile wireless communication network, the SDR transceiver in physical layer must be controlled to generate the minimum transmit power. The bit error rate (BER) performance of the SDR transceiver is simulated to generate the training data for the APC. The system parameters are shown in Table 4. The inputs of APC are data rate, user speed, signal-to-interference-plus-noise-ratio (SINR) and BER.

If the signal can be reliably transmitted between the BS and mobile station (MS), under the conditions of low bit error rate (BER), the SINR of the BS receiver must greater than the minimum threshold $\gamma_0$.

$$SINR_c = \frac{P}{N_0 + I} \geq \gamma_0 \quad (23)$$

where P is the received signal power of the BS, I is the received interference power, $N_0$ is the thermal noise power of the BS receiver. Under the conditions of different data rate and user speed, the BER performance of SISO-OFDM transceiver using the SUI-3 channel model [3] is simulated and shown in FIG. 9 in order to calculate the minimum threshold. The threshold is defined as $$\gamma = \frac{E_b R_b}{N_0 B} = \frac{E_b R_b}{N} \quad (24)$$

where $E_b/N_0$ is the bit energy to noise ratio, $R_b$ is the bit rate and, B is the receiver bandwidth. The value of received $SINR_C$ locates between $\gamma_1$ 與 $\gamma_2$.

$$\gamma_1 \leq SINR_c \leq \gamma_2 \quad (25)$$

where the minimum SINR threshold $\gamma_1$ corresponds to $R_{b1}$ and the maximum SINR threshold $\gamma_2$ corresponds to $R_{b2}$. Then the APC determines $R_{b1}$ as the data rate of the transceiver. However, the measurement value of $SINR_C$ changes with the variation of fading channel, thus the $SINR_C$ will be replaced with average signal-to-interference-plus-noise-ratio $\overline{SINR}_c$.

$$\overline{SINR}_c = (1-w)(\overline{SINR}_c)' + w SINR_c \quad (26)$$

where $(\overline{SINR}_c)'$ is the average value of signal-to-interference-plus-noise-ratio measured at previous window time. The weight $w \leq 0.1$ determines the empirical value of the receiver signal-to-interference-plus-noise-ratio.

TABLE 4

| | |
|---|---|
| FFT length | 128 |
| Number of data subcarriers | 72 |
| Number of pilot subcarriers | 12 |
| Data + pilot (include DC) subcarriers | 85 |
| Modulation scheme | QPSK · 16QAM · 64QAM |
| CP ratio | 1/4 |
| Low frequency guard subcarrier | 22 |
| High frequency guard subcarrier | 21 |
| System bandwidth (MHz) | 10 |

TABLE 4-continued

| | | |
|---|---|---|
| Subcarrier frequency spacing Δf (kHz) | 89.25 | $\frac{n \cdot BW}{N_{FFT}}$ |
| Sampling frequency (MHz) | 11.429 | $n \cdot BW$ |
| Sampling factor, n | 8/7 | $\frac{f_s}{BW}$ |
| Symbol duration $T_b$ (μs) | 11.204 | $\frac{1}{\Delta f}$ |
| CP duration $T_g$ (μs) | 2.8010 | $\frac{T_b}{4}$ |
| Total OFDM symbol duration (μs) | 14.005 | $T_g + T_b$ |
| Fading channel | SUI-3 | |
| Carrier frequency $f_c$ (GHz) | 2.5 | |
| User speed (km/hr) | 20, 40, 60, 80, 100 | |

In the simulation of the present embodiment, for the different modulation and code rate, the transmitter has a maximum transmission power limit, and its specifications are listed in Table 5. When the transceiver switches to the different modulation and code rate mode in accordance with the assigned data rate and the BER of the receiver is still able to meet the performance requirements, the simulation results of FIG. 9 must be used as a training data to define the SINR threshold value (as shown in Table 5) for BER equal to $10^{-5}$. In each pair of modulation and code rate mode, the difference between the SINR measurement value and the SINR threshold value is used to control the size of the transmit power increment ΔP, which must compliance with the provisions of table V. The transmit power increases with the inter-cell interference. If the transmit power reaches the upper limit, transmitter maintains the maximum transmit power and initiates the AIC to point the proper beam nulling of smart array antenna to the direction of interference signal in order to remain the output SINR of the receiver higher than a threshold value.

TABLE 5

| Modulation | Maximum transmit power(dB) |
|---|---|
| QPSK 1/2 | 6 |
| QPSK 3/4 | 9 |
| 16QAM 1/2 | 12 |
| 16QAM 3/4 | 15 |
| 64QAM 2/3 | 20 |

The inputs of the APC are the user speed (V), data rate ($R_b$), SINR and BER, the output is a transmit power increment ΔP. The power controller defines the user speed of 20 km/hr and 40 km/hr as low (L), it defines 60 km/hr and 80 km/hr as medium (M), it defines 100 km/hr as high (H); it defines the data rate of 64 kbps and 128 kbps as low (L), it defines 192 kbps and 256 kbps as medium (M), it defines 384 kbps and 512 kbps as high (H); it defines SINR less than 0 dB for L, it defines SINR in 0 dB~10 dB for M, it defines the SINR greater than 10 dB for H; it defines the BER of less than $1 \times 10^{-5}$ as L, it defines the BER of exceeding $1 \times 10^{-5}$ as H (as shown in Table 6). The user speed is divided into three levels; the data rate is divided into three levels; the SINR is divided into three levels; the BER is divided into two levels.

TABLE 6

| threshold (dB) | 20 km/hr | 40 km/hr | 60 km/hr | 80 km/hr | 100 km/hr |
|---|---|---|---|---|---|
| QPSK 1/2 | 0 | 1 | 1 | 2 | 2 |
| QPSK 3/4 | 3 | 4 | 4 | 5 | 5 |
| 16QAM 1/2 | 6 | 7 | 8 | 8 | 9 |
| 16QAM 3/4 | 10 | 11 | 12 | 12 | 13 |
| 64QAM 2/3 | 16 | 17 | 17 | 18 | 18 |

Without any loss of generality, the optimization objection of minimum transmit power of the APC is formally formulated as follows:

optimization assignment $\Delta P = f(\vec{y}_m)$ subject to:

$\Delta P \in \{0 \sim 20 \text{ dB}\}$ $20 \text{ km/hr} \leq y_{1,m} \leq 100 \text{ km/hr}$ $64 \text{ kbps} \leq y_{2,m} \leq 512 \text{ kbps}$ $-10 \text{ dB} \leq y_{3,m} \leq 20 \text{ dB}$ $y_{4,m} \leq 10^{-5}$ (27)

where the decision variables of the $m_{th}$ input data vector $\vec{y}_m = [y_{1,m}, y_{2,m}, y_{3,m}, y_{4,m}]^{transpose}$ are defined as $y_{1,m} = V_m, y_{2,m} = R_{b,m}, y_{3,m} = \text{SINR}_m, y_{4,m} = \text{BER}_m.$ (28)

Figure 10:
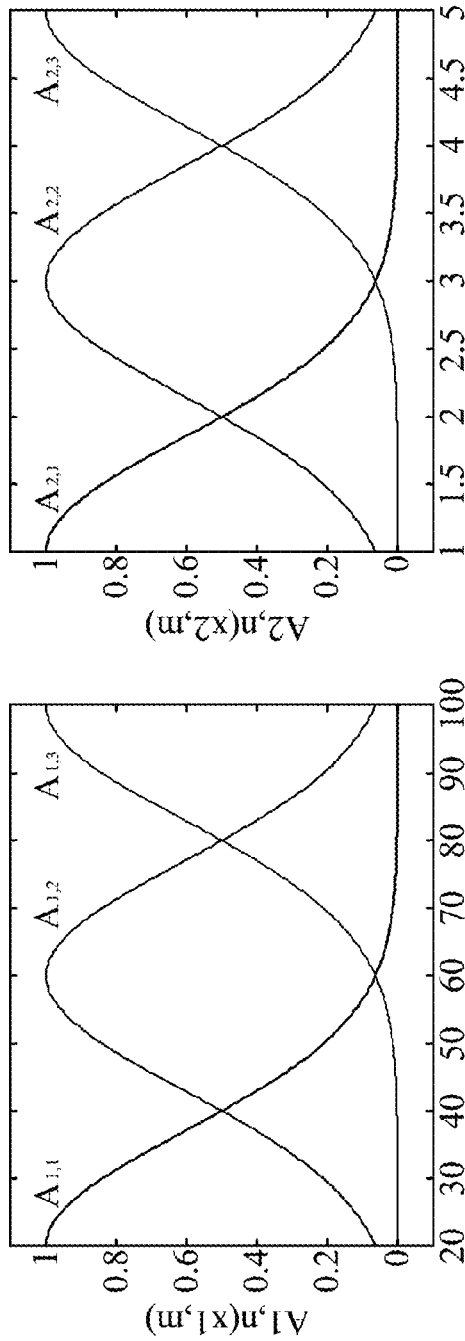
FIGS. 10(A) to (D) show initial membership functions of ANFIS power controller.
Figure 10:
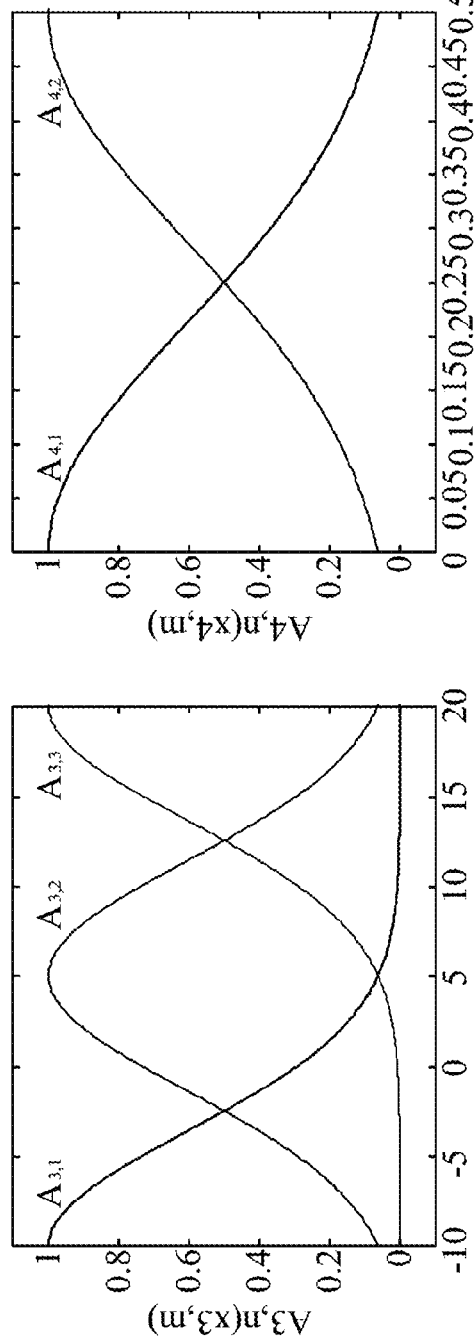
Figure 11:
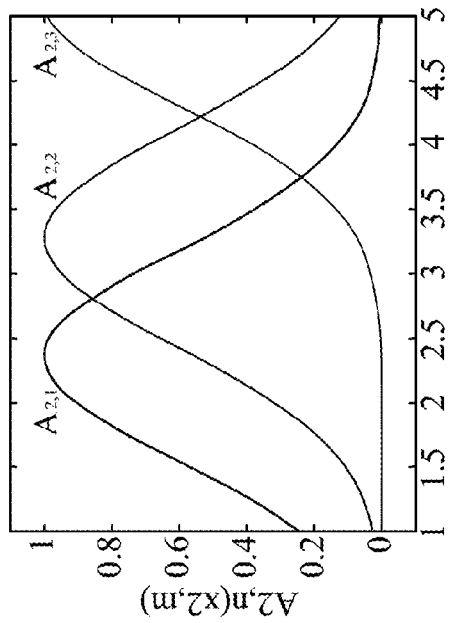
FIGS. 11(A) to (D) show learned membership functions of ANFIS power controller.
Figure 11:
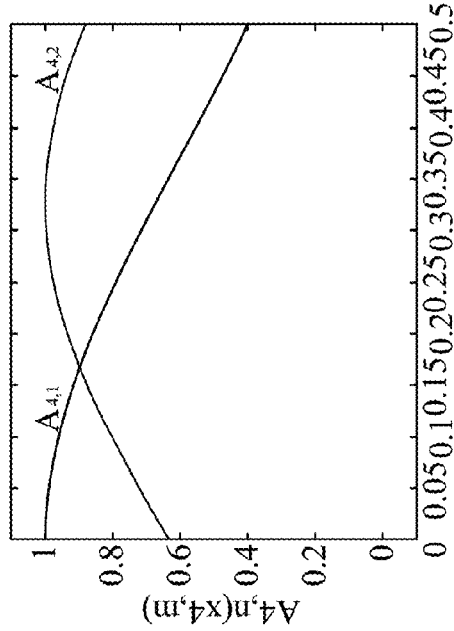
Figure 11:
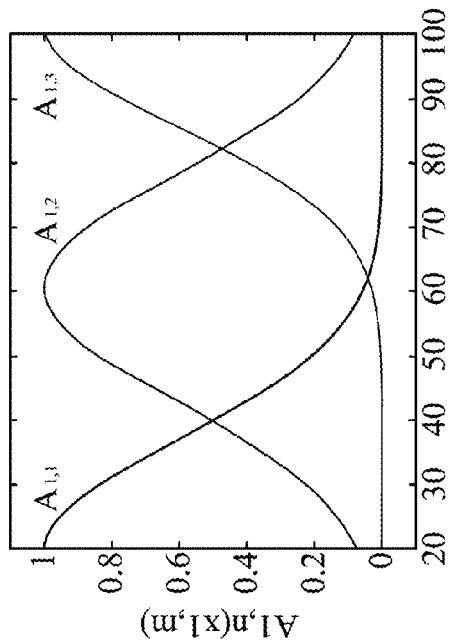
Figure 11:
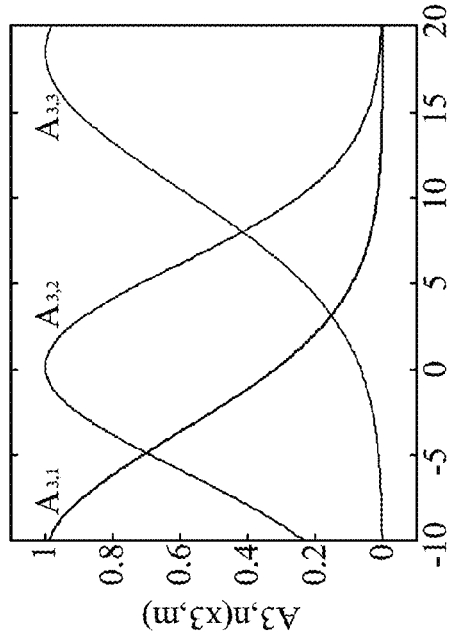
Figure 12:
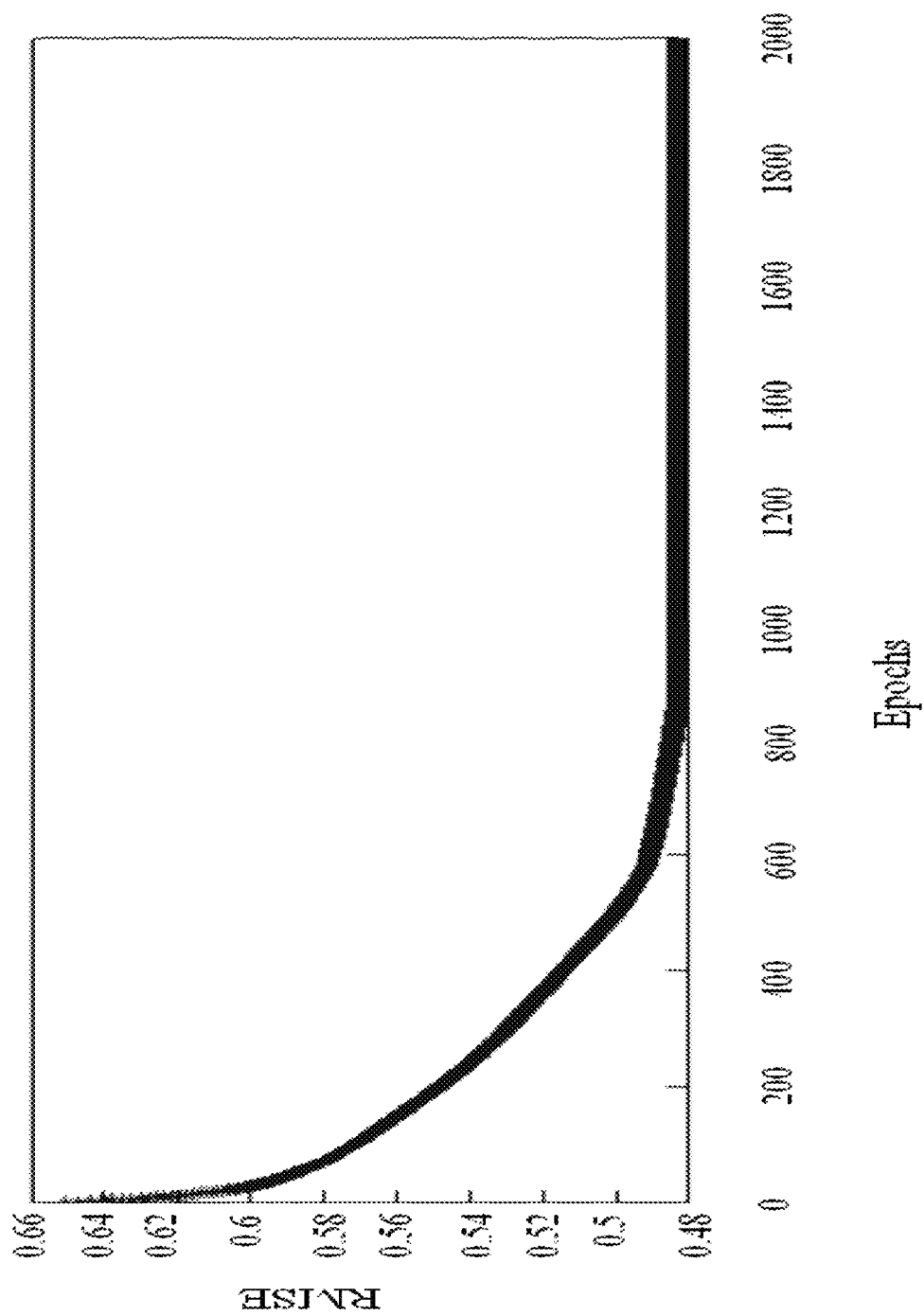
FIG. 12 shows root mean square error of ANFIS power controller.

The training data was sent to the APC to perform the hybrid learning procedure repeatedly. The premise parameters of eight MFs before and after training are shown in FIG. 10 and FIG. 11, respectively. APC and ARC architecture is the same, the difference is that the number of membership functions and the number of levels selected in each of membership functions. When the number of membership functions and the number of input level are increased, the output of the APC can be more accurate, but the program is also more complex. The RMSE of the APC is shown in FIG. 12, which is convergent after 800 epochs,

[4] Raj Jain, "Channel Model A Tutorial," *WiMAX Forum*, Feb. 21, 2007.

(C) AIC: The AIC, which estimates the SINR, DOAs of target and interference signals, and angular spread from the reception signals, is able to autonomously assign the proper number of nulls to the smart array antenna in the varying interference power and angular spread environments to achieve the optimum objectiveness of maintaining the output SINR higher than a threshold value. When the AIC controls the smart antenna with digital beamforming (DBF) multiple null mode to eliminate interference, the null width, the null depth and zero placed way must be considered. Insufficient zero number will result in a null area is not broad enough, but excessive use of zeroing also causes a reduction of degrees of freedom of the system, so in actual use must be optimized to select null quantity. When we construct multiple null mode, Steyskal [5] method is referred. He developed the relationship among null quantity, null width and null depth. If the directions of target signal and interference source have been estimated by the DOA mode, the DBF can point the antenna main beam to signal source, and adapt the antenna null on the interference source to eliminate the interference. The interference included in the DBF output is suppressed to a minimum value, in order to produce the optimum beamforming weights [6], to thereby obtain the best receiver performance. The optimum weights of the DBF is expressed as $$w = \left[ I - \sum_{n=1}^{N} \left( \frac{\lambda_n - \lambda_{min}}{\lambda_n} \right) (u_n u_n^H) \right] v(\theta_s)$$ (29)

The peak sidelobe level (PSLL) is defined as the highest sidelobe (dB) relative to the peak value of main beam. The fast subspace decomposition (FSD) algorithm [7] and Lanczos algorithm are used in inverse matrix operations. If the covariance matrix is a diagonal matrix, it can keep the orthogonality of eigenvectors. Therefore, the total number of multipliers to compute the eigenvalues and eigenvectors [7] is $N_m = 5M^*(q+1) + M/2^*(q+1)^*(q+4) + 2^*(q^{2*}(q-1))$ (30)

where M is the number of array elements and q is the number of nulls. The AIC employs the output SINR (SINRo) of DBF to assess the performance of SDR DBF and the calculating formula [8] of output SINR is $$SINR_o = \frac{\sigma_s^2 w^H v(\theta_s) v^H(\theta_s) w}{w^H \left( \sum_{j=1}^{J} \sigma_j^2 v(\theta_j) v^H(\theta_j) + Q \right) w}$$ (31)

where $\sigma_s^2$ and $\sigma_j^2$ are the variance of signal and $j_{th}$ interference, Q is the diagonal matrix of noise variance. The input SINR ($SINR_i$) is defined as $$SINR_i = \frac{\sigma_s^2}{\sigma_j^2 + \sigma_n^2}$$ (32)

where $\sigma_n^2$, is the variance of noise, which is assumed to be uncorrelated with the interference and signal. The $SINR_{improve}$ is defined as $SINR_{improve} = SINR_{oq} - SINR_{o0}$ (33)

where $SINR_{oq}$ represents $SINR_o$ for q-zero null and $SINR_{o0}$ represents $SINR_o$ without using null. The $SINR_{gain}$ is defined as $SINR_{gain} = SINR_{oq} - SINR_i$ (34)

The optimization object of the AIC is to automatically assign the optimum smallest number of nulls to smart antenna in order to maintain the output SINR of the receiver higher than a specified threshold value in the multi-path fading channel environment of different angular spreads so that the AIC can remain the transceiver BER less than $10^{-5}$ in the inter-cell interference environments. In the simulations, the aim of the AIC is to maintain the SINR of receiver higher than 30 dB in the high interference and fading environments. The interference DOA ($D_m$), angular spread ($W_m$) and SINR ($S_m$) are the inputs, the assigned number of nulls (q) is the output. In the AIC, the range of interference DOA is $-70°\sim70°$, which is divided into six levels; the range of angular spread is 5.73° to 17.25°, which is divided into six levels; the range of SINR is $-30$ dB to 0 dB, which is divided into 14 levels. Without loss of generality, the AIC will be based on the best number of nulls assigned to the SDR DBF. The optimization object of the AIC is formally formulated as follows:

The optimization object of the AIC is to minimize the interference of the receiver optimally assign the minimum number of nulls $q=f(\vec{x})$ subject to $\vec{z}_m \in \{z_{1,m}, z_{2,m}, \text{ and } z_{3,m}\}$ $q \in \{1,2,3,4 \text{ and } 5 \text{ nulls}\}$ $-70° \leq z_{1,m} \leq 70°$ $5.73° \leq z_{2,m} \leq 17.25°$ $-30 \text{ dB} \leq z_{3,m} \leq 0 \text{ dB}$ $SINR_o \geq 30 \text{ dB}$ (35)

where the decision variables of the $m_{th}$ input data vector $\vec{z}_m = [z_{1,m}, z_{2,m}, z_{3,m}]^{transpose}$ are defined as $z_{1,m} = D_m, z_{2,m} = W_m, z_{3,m} = S_m$. (36)

TABLE 7

| input | | | | output | input | | | | output |
|---|---|---|---|---|---|---|---|---|---|
| speed | MCS | SINR | BER | ΔP | speed | MCS | SINR | BER | ΔP |
| L | L | L | L | 0 | L | L | L | H | 6 |
| L | L | M | L | 0 | L | L | M | H | 3 |
| L | L | H | L | 0 | L | L | H | H | 1 |
| L | M | L | L | 0 | L | M | L | H | 12 |
| L | M | M | L | 0 | L | M | M | H | 6 |
| L | M | H | L | 0 | L | M | H | H | 1 |
| L | H | L | L | 0 | L | H | L | H | 20 |
| L | H | M | L | 0 | L | H | M | H | 10 |
| L | H | H | L | 0 | L | H | H | H | 3 |
| M | L | L | L | 0 | M | L | L | H | 7 |
| M | L | M | L | 0 | M | L | M | H | 3 |
| M | L | H | L | 0 | M | L | H | H | 1 |
| M | M | L | L | 0 | M | M | L | H | 14 |
| M | M | M | L | 0 | M | M | M | H | 5 |
| M | M | H | L | 0 | M | M | H | H | 1 |
| M | H | L | L | 0 | M | H | L | H | 20 |
| M | H | M | L | 0 | M | H | M | H | 11 |
| M | H | H | L | 0 | M | H | H | H | 4 |
| H | L | L | L | 0 | H | L | L | H | 7 |
| H | L | M | L | 0 | H | L | M | H | 3 |
| H | L | H | L | 0 | H | L | H | H | 1 |
| H | M | L | L | 0 | H | M | L | H | 13 |
| H | M | M | L | 0 | H | M | M | H | 5 |
| H | M | H | L | 0 | H | M | H | H | 1 |
| H | H | L | L | 0 | H | H | L | H | 20 |
| H | H | M | L | 0 | H | H | M | H | 11 |
| H | H | H | L | 0 | H | H | H | H | 3 |

During the test, the average received signal power is set to 0 dB to calculate the input SINR ($SINR_i$). The test of AIC based SDR DBF is performed in terms of different angular spread, while the DOA of interference is fixed at −30° and $SINR_i$ is fixed at −24 dB. As shown in FIG. 13(A), the output SINR of DBF using the AIC-based SDR DBF and optimum beamforming algorithm for different $SINR_i$ values. This shows that the output SINRs of DBF using the optimum beamforming algorithm with 4 and 5 nulls and the AIC-based SDR DBF for different $SINR_i$ values are higher than 30 dB. As shown in FIG. 13(b), the output SINR of DBF using AIC is always higher than 30 dB for different angular spreads. On the other hand, the output SINR of DBF with an optimum beamforming algorithm will less than 30 dB when the number of nulls is lower than five and the angular spread becomes high. Their PSLL, $SINR_{gain}$ and $SINR_{improve}$ values are summarized in Table 8. It can be seen that the required multipliers for AIC-based SDR DBF and optimum beamforming algorithm with 4 and 5 nulls are 3,432, 5,616 and 7,592, respectively. The required number of multipliers for AIC-based SDR DBF is significantly reduced.

TABLE 8

| M | q | Number of multipliers | PSLL (dB) | $SINR_{improve}$ (dB) | $SINR_{gain}$ (dB) | Null depth (dB) |
|---|---|---|---|---|---|---|
| 16 | 4 | 5,616 | −24.62 | 33.37 | 57.94 | −70.56 |
| | 5 | 7,592 | −21.35 | 46.82 | 71.39 | −85.81 |
| | ANFIS | 3,432 | −28.06 | 9.98 | 34.68 | −42.03 |

Figure 16:
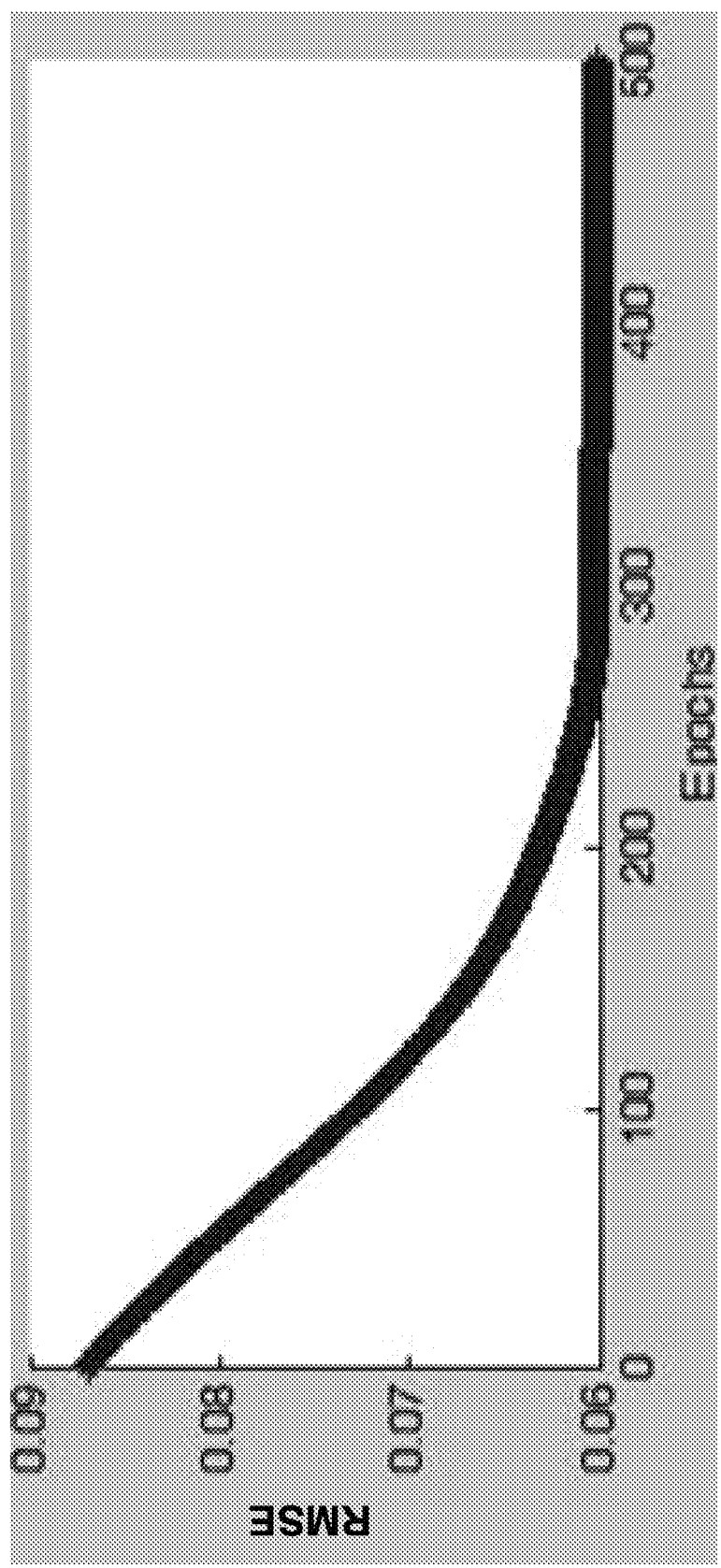
FIG. 16 shows root mean square error of ANFIS interference controller.

The training data was sent to the AIC to perform the hybrid learning procedure repeatedly. The premise parameters of eight MFs before and after training are shown in FIG. 14 and FIG. 15, respectively. Because the input training data and complexity of the AIC is more than those of the ARC and APC, it is necessary to use 6, 6 and 14 membership function levels for the interference DOA, angular spread and SINR, respectively, to converge. The AIC will produce a larger amount of computation using a Gaussian membership function caused by insufficient memory space, so the triangular membership function is chosen to reduce the amount of computation for the training. The RMSE of the AIC is shown in FIG. 16, which is convergent after 250 epochs.

[5] H. Steyskal, "Wide-Band Nulling Performance Versus Number of Pattern Constraints for an Array Antenna," *IEEE Trans. Antennas Propagat.*, vol. Ap-31, no. 1, pp. 159-163, January, 1983.

[6] J. R. Guerci, *Space-Time Adaptive Processing for Radar*, Artech House, Boston, 2003.

[7] G. Xu and T. Kailath, "Fast Signal-subspace Decomposition without Eigendecomposition", Twenty-Fourth Asilomar Conference on Signals, Systems and Computers, 1990.

[8] Y. P. Liu and Q. Wan, "Total Difference Based Partial Sparse LCMV Beamformer," *Progress In Electromagnetics Research Letters*, Vol. 18, pp. 97-103, 2010.

Figure 17A:
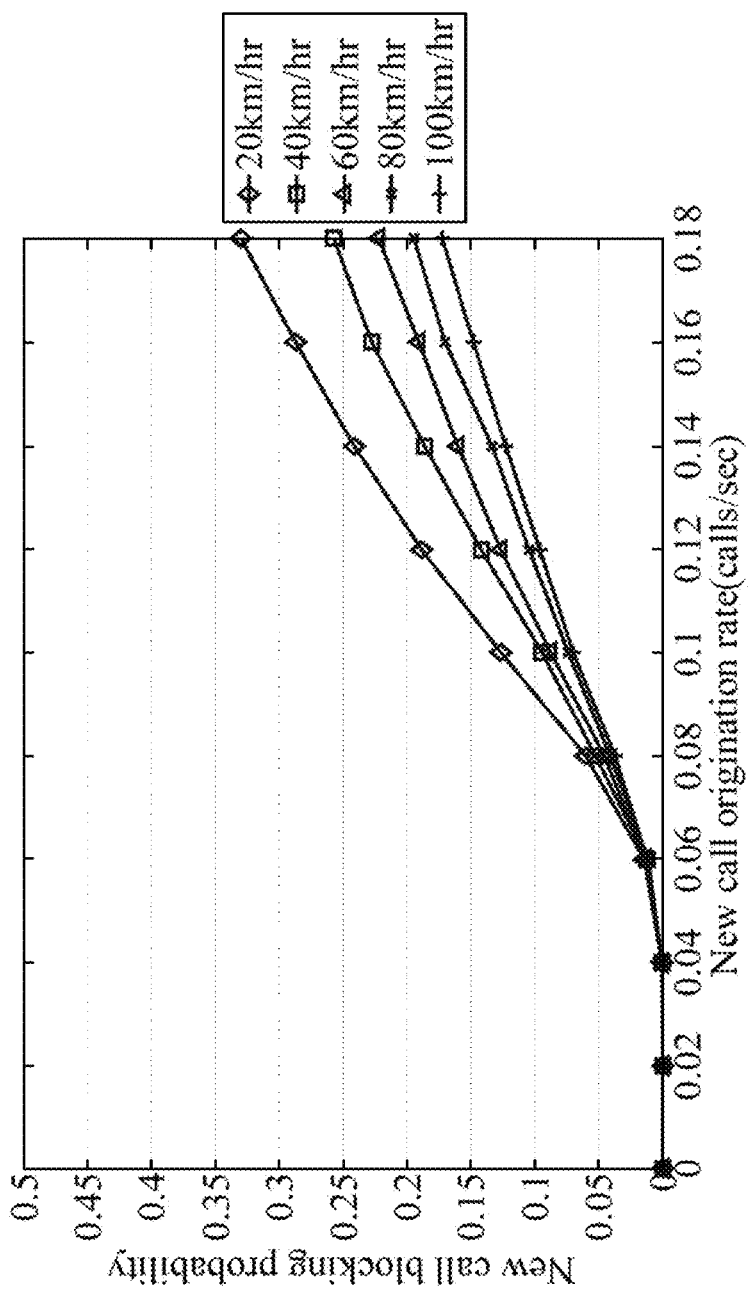
FIG. 17(A) shows new call blocking probability of mobile wireless communication networks using PBBA protocol.
Figure 17B:
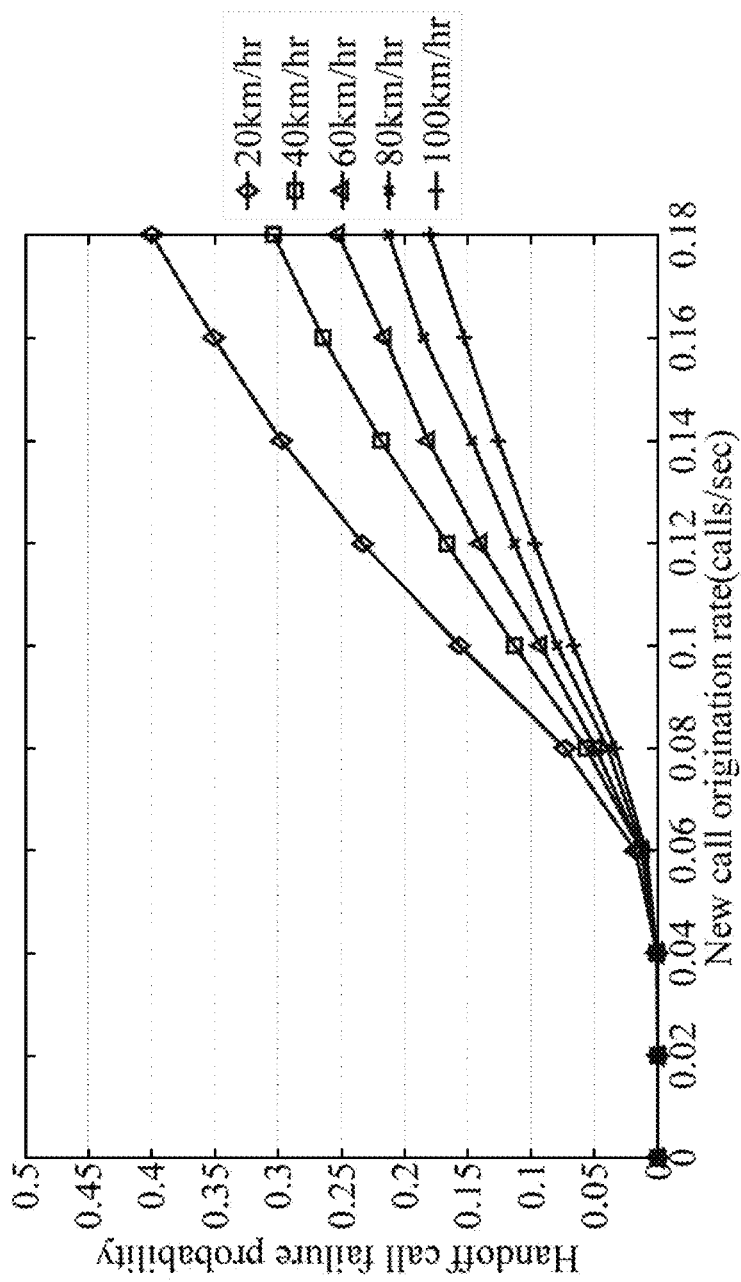
FIG. 17(B) shows hand off failure probability of mobile wireless communication networks using PBBA protocol.
Figure 17C:
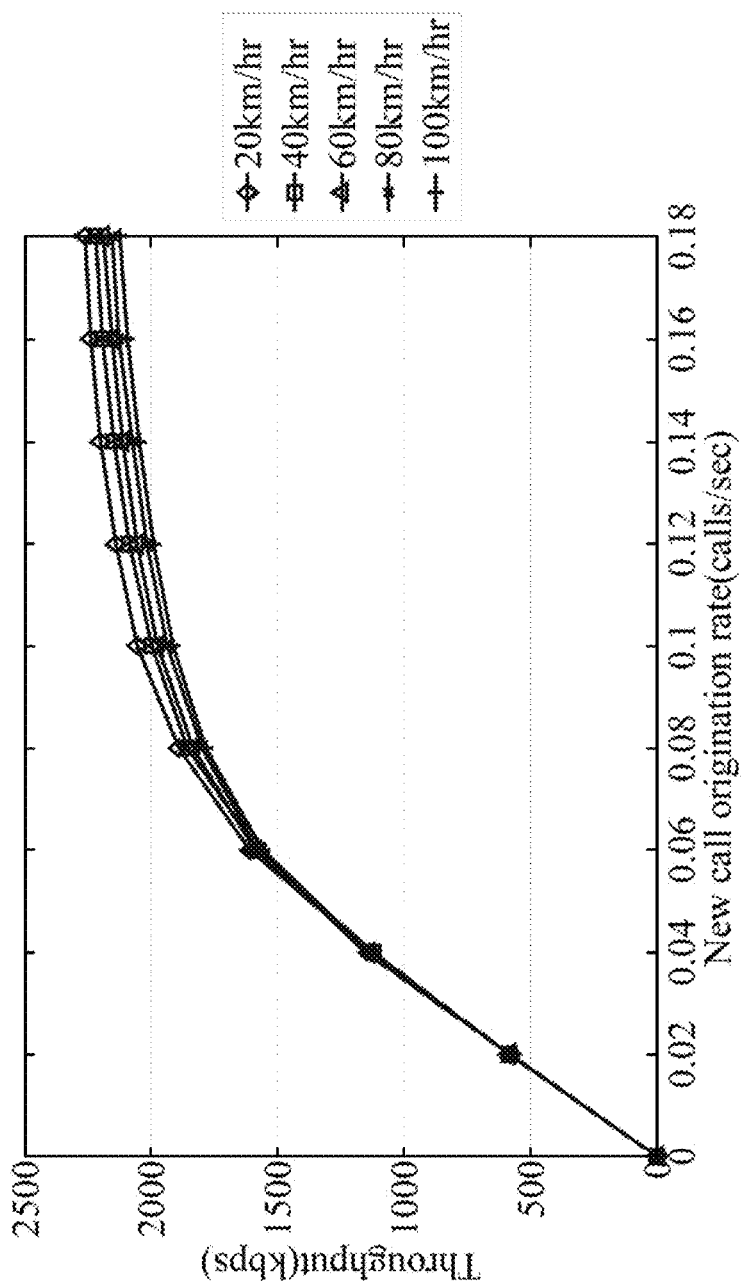
FIG. 17(C) shows average system throughput of mobile wireless communication networks using PBBA protocol.
Figure 18A:
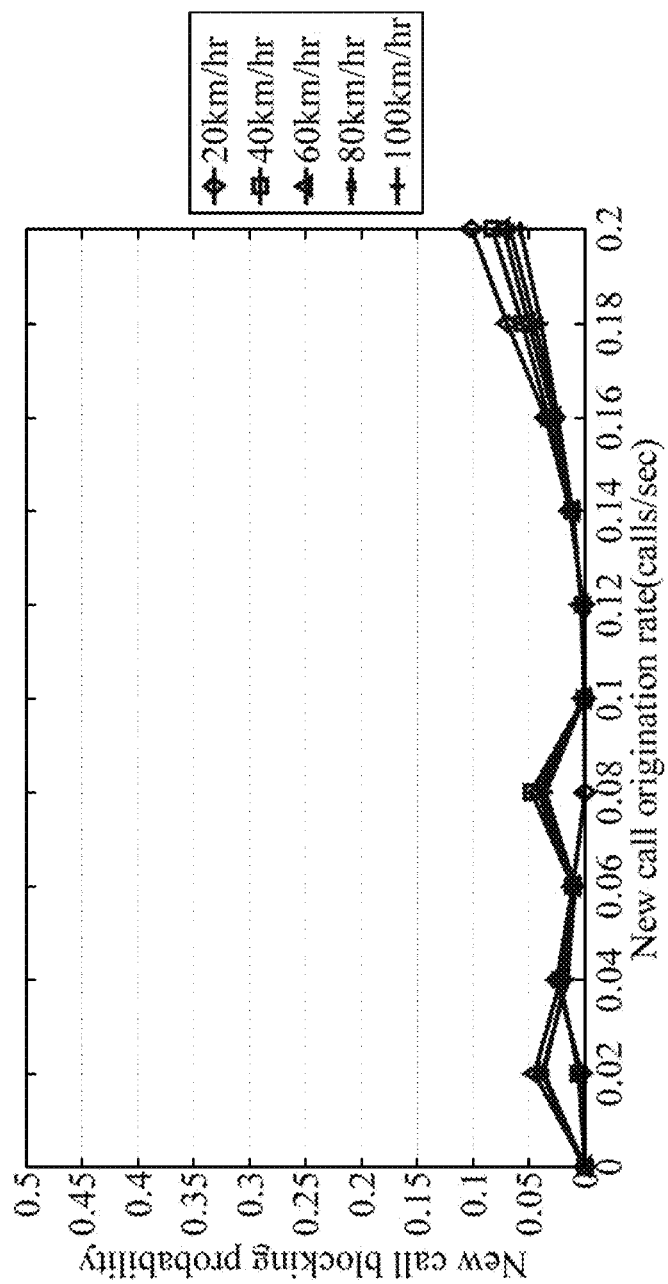
FIG. 18(A) shows new call blocking probability of mobile wireless communication networks using PBBA protocol and cascade ANFIS rate and power controller.
Figure 18B:
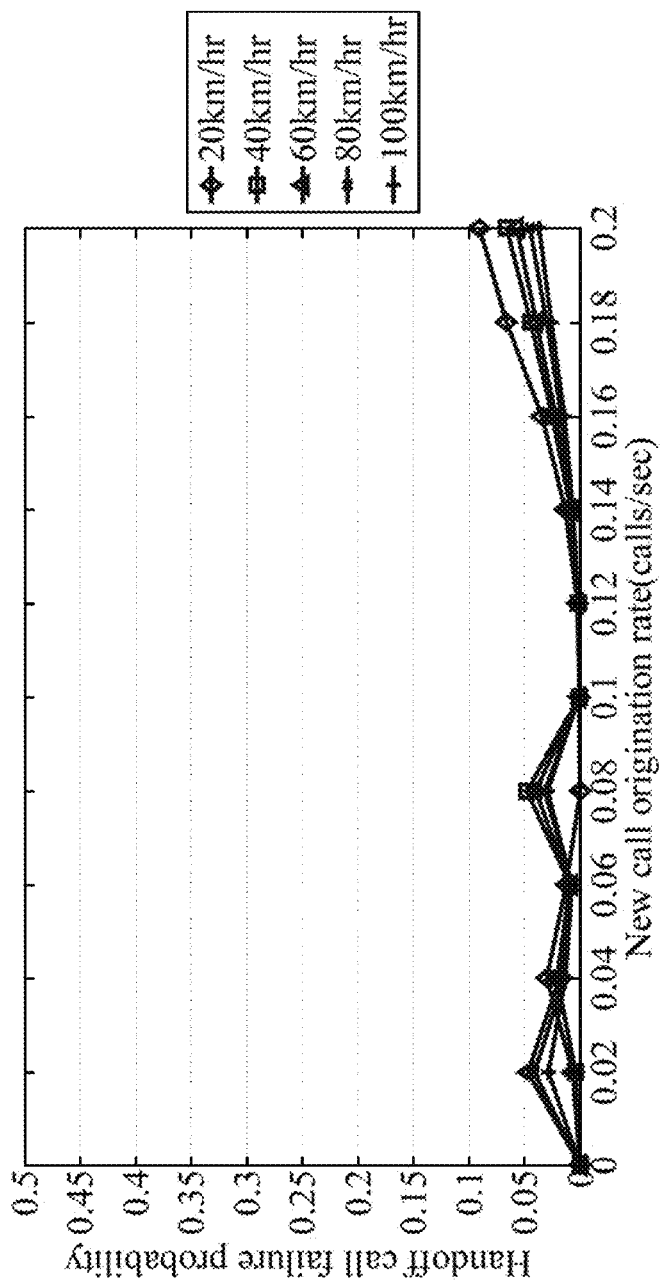
FIG. 18(B) shows hand off failure probability of mobile wireless communication networks using PBBA protocol and cascade ANFIS rate and power controller.
Figure 18C:
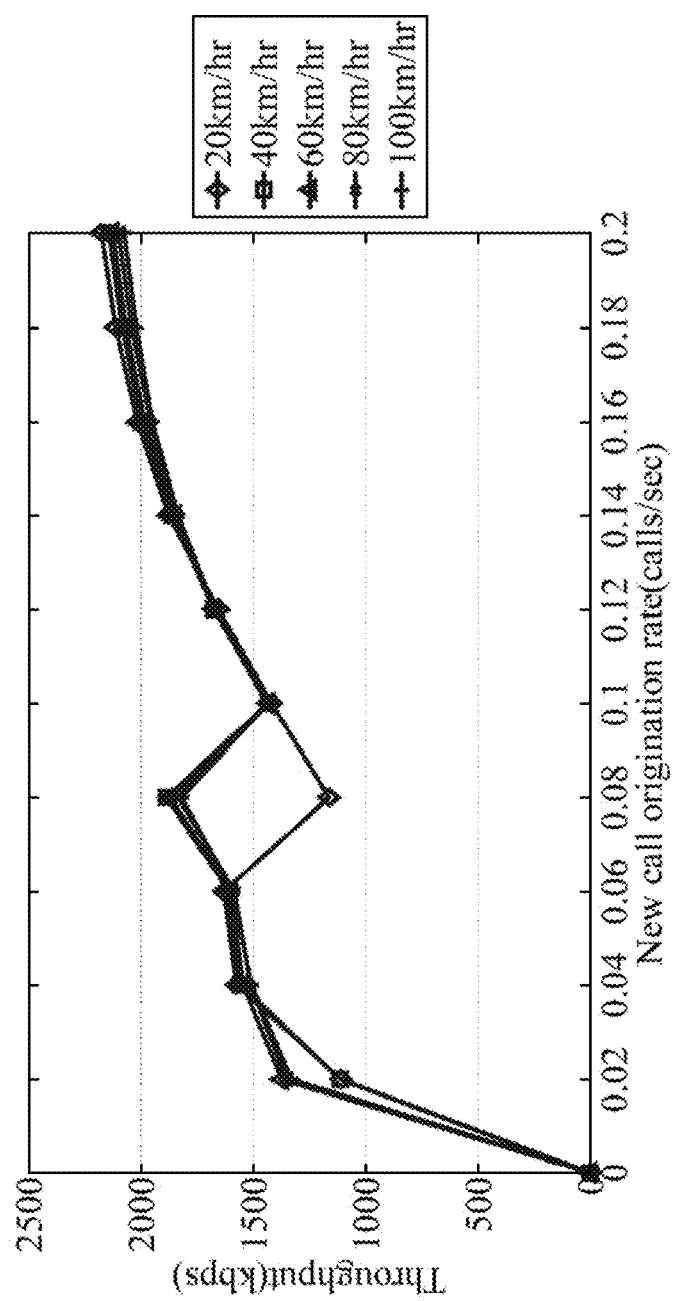
FIG. 18(C) shows average system throughput of mobile wireless communication networks using PBBA protocol and cascade ANFIS rate and power controller.
Figure 19A:
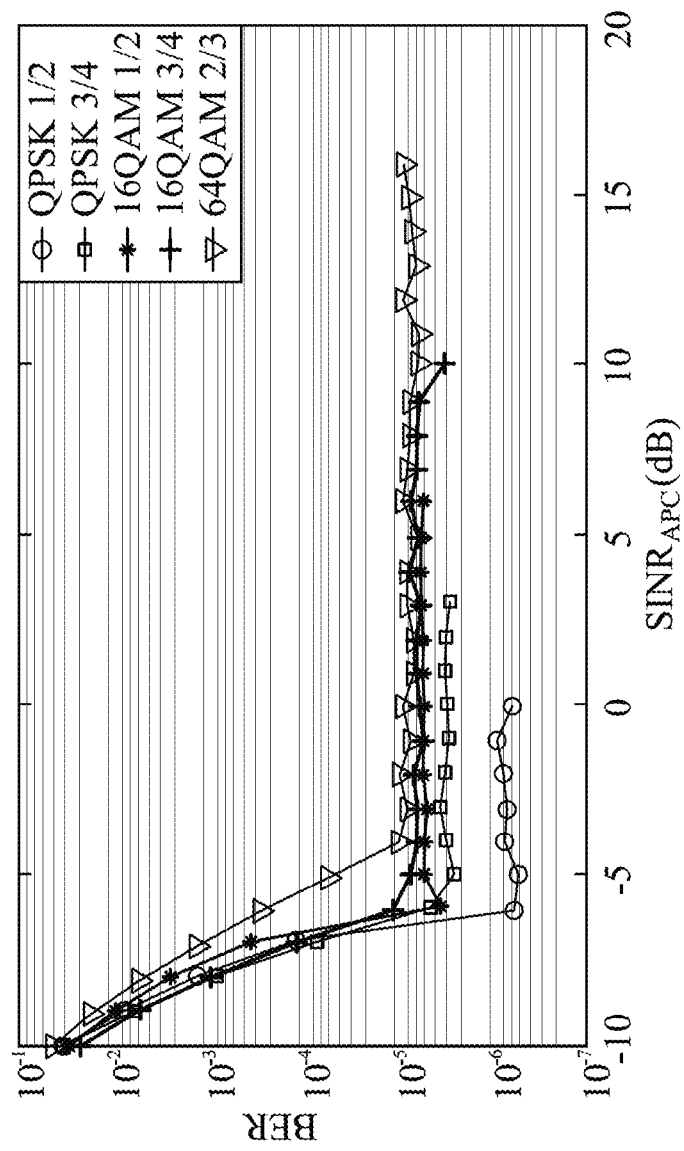
FIG. 19(A) illustrates the BER performance of transceiver using APC over SUI-3 channel for user speed of 20 Km/hr.
Figure 19B:
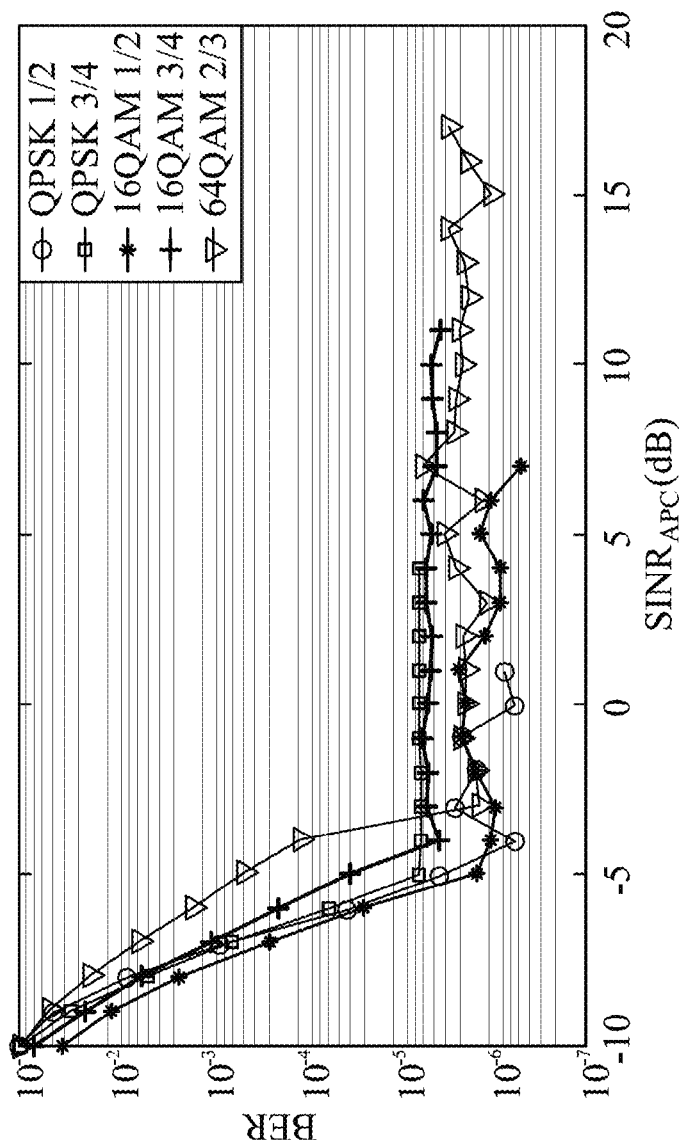
FIG. 19(B) illustrates the BER performance of transceiver using APC over SUI-3 channel for user speed of 40 Km/hr.
Figure 19C:
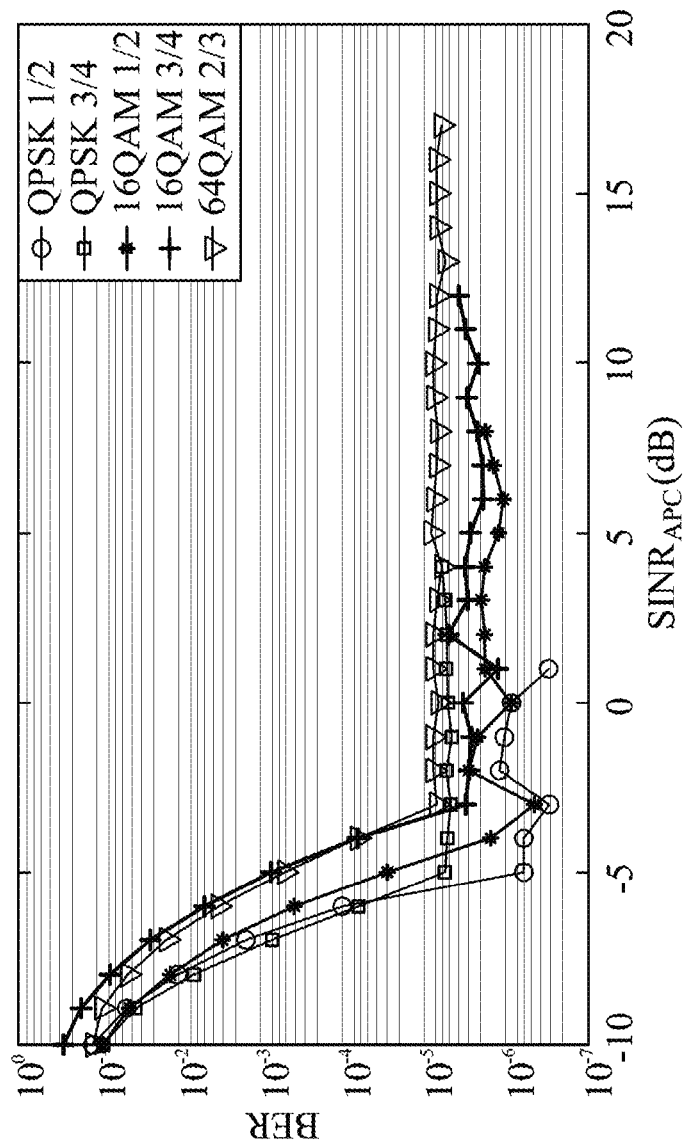
FIG. 19(C) illustrates the BER performance of transceiver using APC over SUI-3 channel for user speed of 60 Km/hr.
Figure 19D:
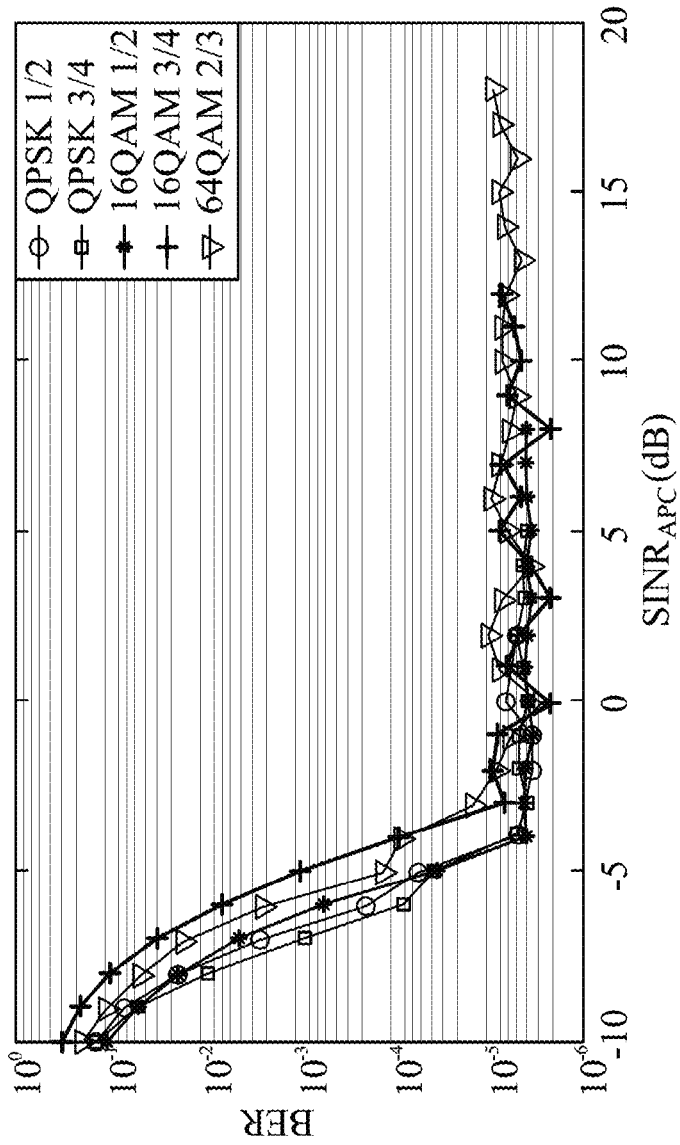
FIG. 19(D) illustrates the BER performance of transceiver using APC over SUI-3 channel for user speed of 80 Km/hr.
Figure 19E:
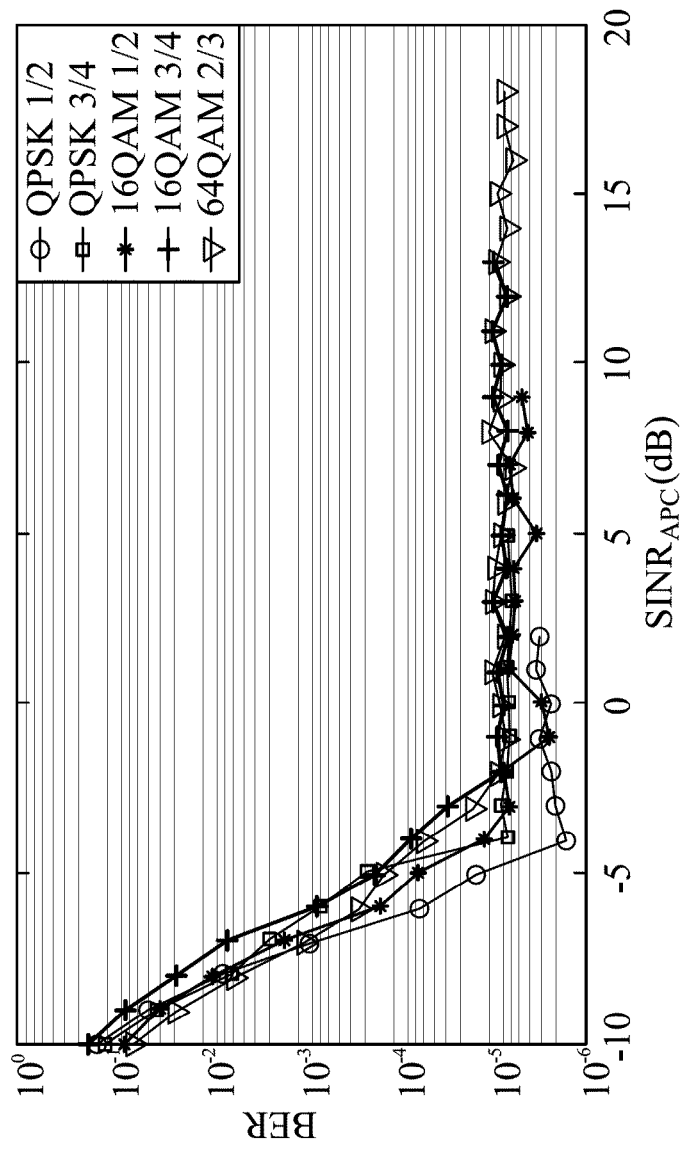
FIG. 19(E) illustrates the BER performance of transceiver using APC over SUI-3 channel for user speed of 100 Km/hr.
Figure 20A:
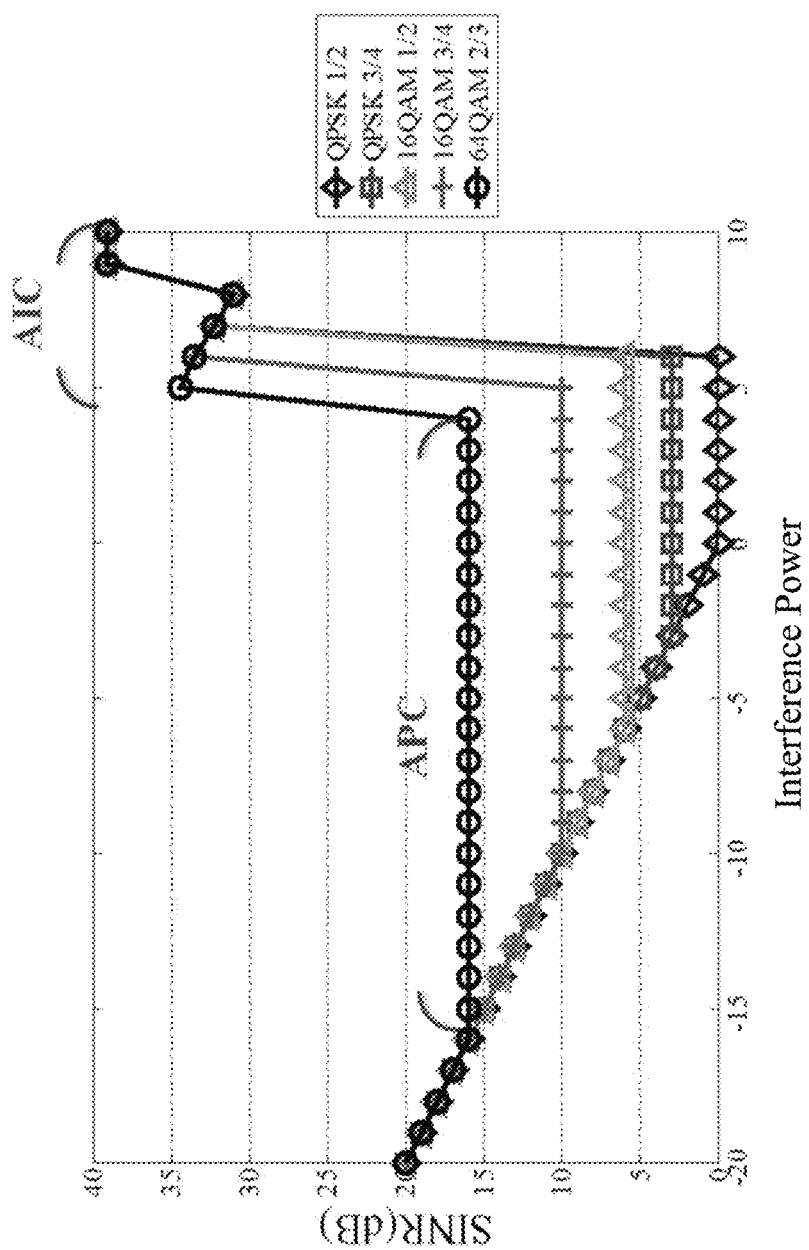
FIG. 20(A) illustrates the SINR performance of transceiver using cascade APC and AIC for user speed of 20 Km/hr.
Figure 20B:
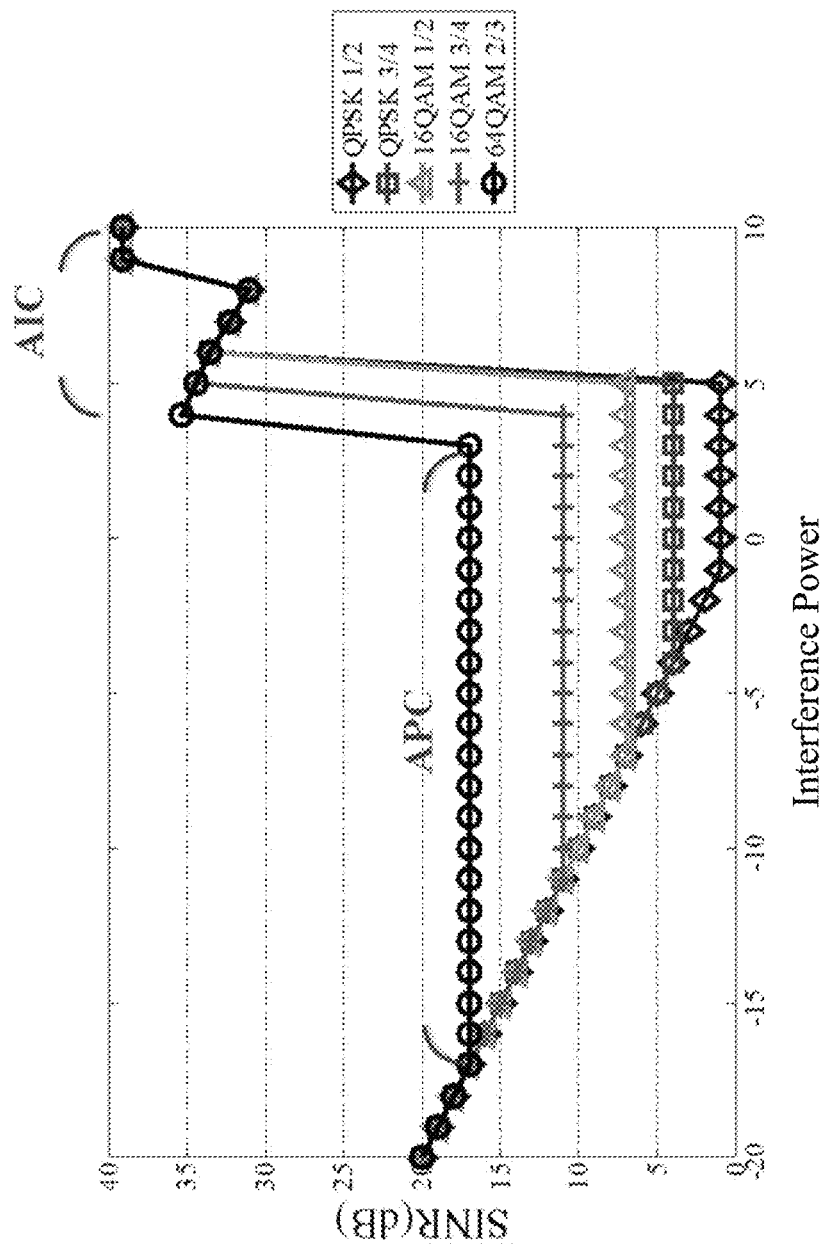
FIG. 20(B) illustrates the SINR performance of transceiver using cascade APC and AIC for user speed of 40 Km/hr.
Figure 20C:
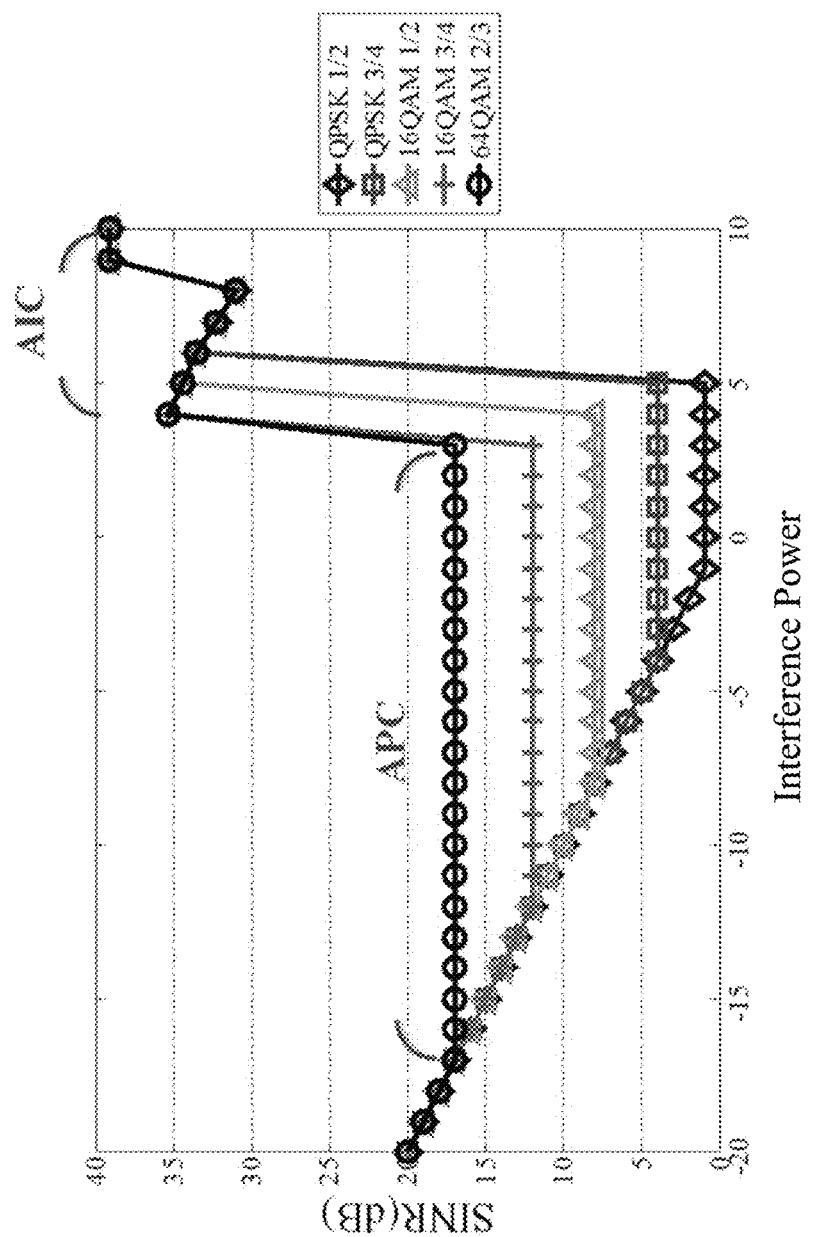
FIG. 20(C) illustrates the SINR performance of transceiver using cascade APC and AIC for user speed of 60 Km/hr.
Figure 20D:
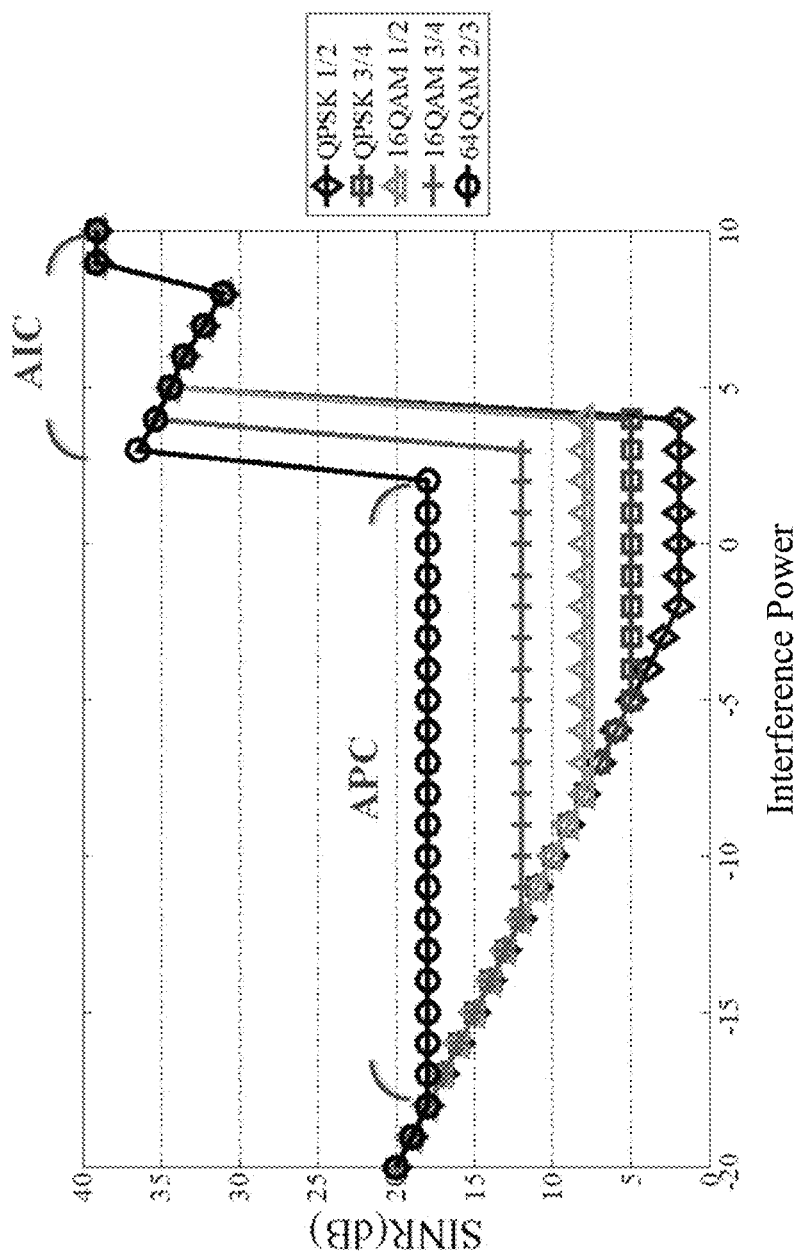
FIG. 20(D) illustrates the SINR performance of transceiver using cascade APC and AIC for user speed of 80 Km/hr.
Figure 20E:
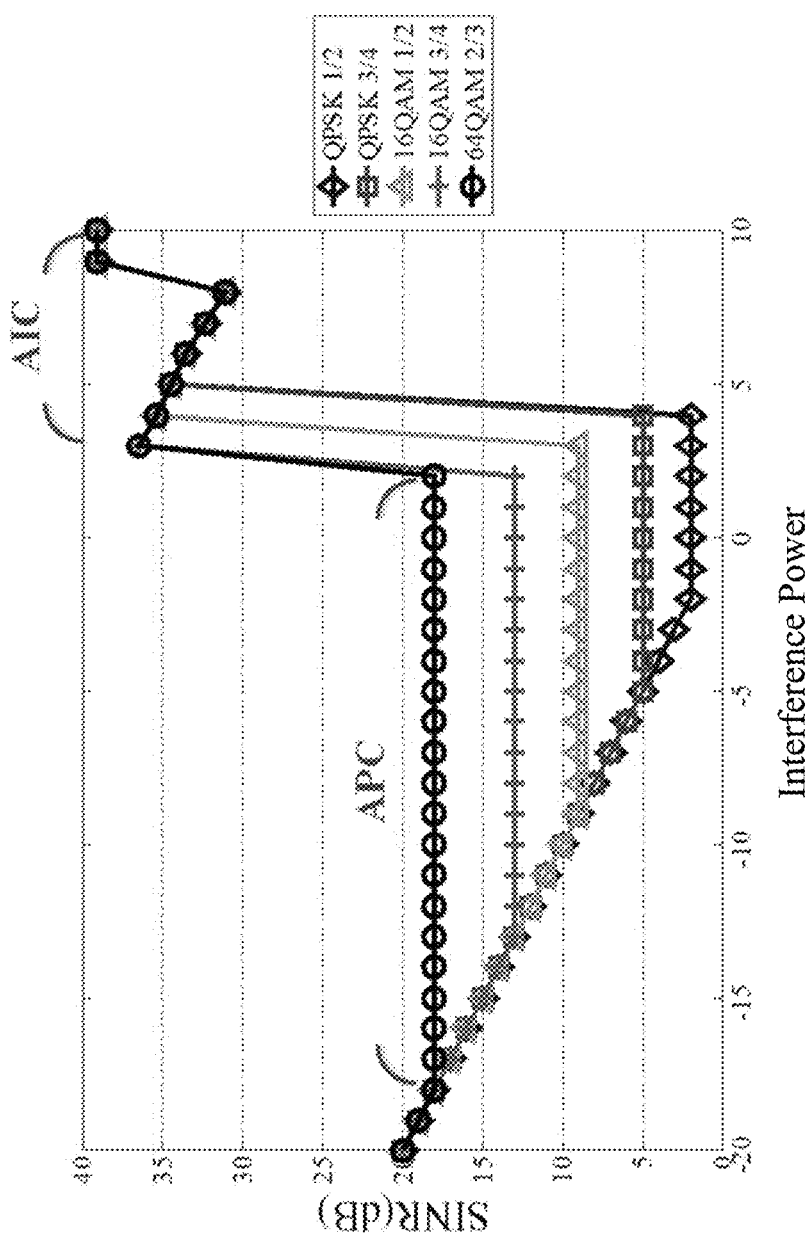
FIG. 20(E) illustrates the SINR performance of transceiver using cascade APC and AIC for user speed of 100 Km/hr.

(D) Simulation results: FIGS. 17(A) and (B) show the new call blocking probability and handoff failure probability of the PBBA protocol, respectively, versus the new call origination rate for five different user speeds. It shows that the new call blocking probability and handoff failure probability increase with the new call origination rate. Moreover, faster user speed leads to lower new call blocking probability and handoff failure probability. Because faster user speed results in shorter cell residence time, the spectrum resources can be released more quickly for both the new and handoff calls. FIG. 17(C) shows the average throughput of the PBBA protocol versus the new call origination rate for five different user speeds. It can be seen that the average throughput increases with new call origination rate, but both the new call blocking probability and handoff failure probability exceed 0.05 as soon as the new call origination rate is greater than 0.07. The high traffic load results in unacceptable QoS for the users of multimedia call services. In FIG. 18, we present the new call blocking probability, handoff failure probability and average throughput of the proposed ARC protocols versus new call origination rate. FIGS. 18(A) and (B) show that the proposed ARC protocol is able to maintain the new call blocking probability and handoff failure probability below 0.05 when the traffic load is lower than 0.17. Due to the constraint of the fixed channel resources assigned to the mobile wireless network, both the new call blocking probability and handoff failure probability are higher than 0.05 and increase with the increase of the new call origination rate when the traffic load exceeds 0.17. It is shown that the ARC protocol could increase the traffic load compared with PBBA protocol. FIG. 18(C) shows the average throughput of the mobile wireless network using the ARC protocol for different traffic loads and five different user speeds. The proposed ARC protocol is able to maintain a fairer average throughput of about 1500 kbps when the traffic load exceeds 0.02. In FIG. 18(C), the average throughput presents up and down changes. The reason is that the new call blocking probability gradually exceeds 0.05 calls/sec, the ARC begins to decreases the new call origination rate, which results in the decrease in average throughput. As in the case of slower speed user, the call occupies the cell channels longer, thus causing the new call blocking rate increased, so that the user data rate in the case of slower speed will be lowered in advance. So FIG. 18(C) shows that the average throughput curve in the user speed of 20 km/hr will be lowered in advance in the new call origination rate of 0.08 calls/sec. And other speed users reduce the average throughput in the new call origination rate of 0.1 calls/sec.

FIG. 19 shows the BER performance of transceiver using APC for different modulations. FIG. 9 and FIG. 19 are compared to generate the APC control processing gain value, as shown in Table 9. The control processing gain (G) dB values are defined as follows:

$$G = SINR_C - SINR_{APC} \tag{36}$$

As can be seen from the Table 9, the APC can significantly improve the performance of mobile wireless communication systems. As soon as the interference power is too high and it cannot make the mobile wireless communication system BER below $10^{-5}$ by increasing transmit power, then the APC will initiate the AIC to eliminate the inter-cell interference power.

TABLE 9

| gain (dB) | 20 km/hr | 40 km/hr | 60 km/hr | 80 km/hr | 100 km/hr |
|---|---|---|---|---|---|
| QPSK 1/2 | 6.4 | 6.3 | 6.3 | 6.1 | 5.9 |
| QPSK 3/4 | 9.1 | 9 | 9 | 8.8 | 8.8 |
| 16QAM 1/2 | 12.2 | 11.9 | 11.9 | 11.7 | 11.7 |
| 16QAM 3/4 | 16 | 14.9 | 14.8 | 14.8 | 14.8 |
| 64QAM 2/3 | 19.9 | 19.9 | 19.8 | 19.8 | 19.8 |

FIG. 20 shows the output SINR of receiver implemented in the SISO-OFDM mobile wireless communication systems using cascade ARC/APC/AIC three layer controllers. FIG. 20(A) is used as an example to demonstrate the functions of ARC, APC and AIC in the environments of different user speeds and different interference power levels. When the ARC adjusts the data rate of transceiver in the case of 64QAM and coding rate of 2/3 and the interference power varies between −20 dB~−17 dB, the BER satisfies the criteria of under $10^{-5}$. The output SINR of receiver decreases with the increasing interference power. However, when the interference power is greater than −16 dB, the BER will not meet the demand of $10^{-5}$ or less, then the ARC will initiate the APC to increase the transmit power. The BER can meet demand of $10^{-5}$ when the interference power varies between −16 dB~−4 dB. Because the APC increases the transmit power value to maintain the output SINR at 16 dB. When the interference power increases to 5 dB, the upper limit of transmit power has been reached, therefore the APC starts the AIC to maintain BER less than $10^{-5}$. Based on the training results, the need to use a null of the DBF to suppress interference when the interference power varies between 5 dB~8 dB but the SINR decreases with the increase in interference power. When the interference power increases to greater than 9 dB, a null has been unable to meet the system requirements, the AIC must increase the number of nulls to two, and thus provide a higher antenna gain, the BER can continue to meet $10^{-5}$ system requirements.

Tables 10 and 11 are summarized from FIG. 20(A) to (E). The interference power ranges of the APC and AIC are listed in Table 10, which is generated for user speed of 20 km/hr as well as five different modulation and code rate. Due to the 64QAM needs larger SINR than 16QAM and QPSK to meet the BER demand of $10^{-5}$, the 64QAM is earlier starting the APC and AIC operation at small interference power than the 16QAM and QPSK. The user speed has the same status. The interference power ranges of the APC and AIC are listed in Table 11, which is generated for five different user speeds as well as 64QAM modulation and 2/3 code rate. The degree of attenuation due to the high speed fading channel is severer than the low speed, therefore, under the same modulation, the user speed of 100 km/hr is earlier starting the APC and AIC operation at small interference power than 20 km/hr.

TABLE 10

| Interference range (dB) | QPSK 1/2 | QPSK 3/4 | 16QAM 1/2 | 16QAM 3/4 | 64QAM 2/3 |
|---|---|---|---|---|---|
| APC | 0~6 | −3~6 | −6~6 | −10~5 | −16~4 |
| AIC | 7~10 | 7~10 | 7~10 | 6~10 | 5~10 |

TABLE 11

| Interference range (dB) | 20 km/hr | 40 km/hr | 60 km/hr | 80 km/hr | 100 km/hr |
|---|---|---|---|---|---|
| APC | −16~4 | −17~3 | −17~3 | −18~2 | −18~2 |
| AIC | 5~10 | 4~10 | 4~10 | 3~10 | 3~10 |

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A three layer cascade adaptive neural fuzzy inference system (ANFIS) based intelligent controller apparatus for a mobile wireless network to produce the maximum network capacity, maximum average throughput, minimum transmit power and interference for multimedia call services, comprising:

an ANFIS rate controller (ARC) in a first network layer, comprising a first ANFIS controller, a traffic performance estimator, a new call origination rate estimator and a user speed estimator, for maximizing the average throughput of the mobile wireless network;

an ANFIS power controller (APC) in a second layer, comprising a second ANFIS controller, a bit error rate (BER) estimator and a signal-to-interference and noise ratio (SINR) estimator, for minimizing the transmit power; and an ANFIS interference controller (AIC) in a third layer, comprising a third ANFIS controller and a direction of arrival (DOA) estimator, for minimizing the interference power;

wherein, said three layer cascade ANFIS based intelligent controller apparatus is connected to the mobile wireless network for maximizing the average throughput, minimizing the transmit power, and minimizing the interference for multimedia services, by autonomously controlling the assignments of transmission data rate, transmit power and antenna null according to the measured network traffic performance, traffic load, user speed, inter-cell interference power, bit error rate (BER) and signal-to-interference-and-noise ratio (SINR) of a transceiver, each estimator is unique to its respective controller.

2. The three layer cascade ANFIS of claim 1, wherein the three layer cascade ANFIS is adapted for a data rate assignment to the changing traffic load, user speed and requested bandwidth of multimedia call services to maintain new call blocking probability and handoff failure probability of the mobile wireless network below a predetermined low level under different user speeds and high new call originate rate while maximizing average throughput.

3. The three layer cascade ANFIS of claim 1, wherein the three layer cascade ANFIS is further adapted for a transmit power increment assignment to the changing BER, SINR and user speed while optimizing the minimum transmit power, and the APC estimates the SINR value; and wherein the transmit power increment assignment and optimizing the minimum transmit power comprises:
the transmit power of transceiver remains unchanged when the SINR is less than the threshold;
the transmit power of transceiver is increased with the interference power to maintain the BER less than $10^{-5}$ when the transmit power is less than the upper bound of transmit power; and
the AIC in the third layer is initiated to reject the interference when the transmit power reaches the upper bound of transmit power.

4. The three layer cascade ANFIS of claim 1, wherein the three layer cascade ANFIS is further adapted for a null width and depth to changing inter-cell interference to minimize the residual interference in order to control the BER of receiver below a prescribed level ($10^{-5}$).

5. The three layer cascade ANFIS of claim 1, wherein the ARC in the first ANFIS controller of the first network layer has four inputs ($x_{1,m}$, $x_{2,m}$, $x_{3,m}$, $x_{4,m}$) comprising new call blocking probability ($P_{N,m}$) handoff failure probability ($P_{h,m}$), new call generation rate (NR) and user speed ($V_m$) and one output is a data rate (G); a Gaussian membership function of new call blocking probability is divided into 2 levels, a Gaussian membership function of handoff failure probability is divided into 2 levels, a Gaussian membership function of new call generation rate is divided into 2 levels, a Gaussian membership function of user speed is divided into 2 levels; 16 fuzzy inference rules; six different output data rates measured in Basic Bandwidth Units (BBU); an average throughput (R) maximization problem of the ANFIS-ARC is formally formulated as follows:

$$\text{Maximize } R = f(\vec{x}), f(\vec{x}) \text{ is the objective function;}$$

$$\text{subject to } G(\vec{x}_m) \le C_{total} \text{ BBUs}$$

$$G(\vec{x}_m) = \sum_{s=1}^{S_m} G_s(\vec{x}_m)$$

$$G_s(\vec{x}_m) \in \{1 \text{ BBUs}, 2 \text{ BBUs}, 3 \text{ BBUs}, 4 \text{ BBUs}, 6 \text{ BBUs}, 8 \text{ BBUs}\}$$

$$x_{1,m} \le 0.05$$

$$x_{2,m} \le 0.05$$

$$0.02 \le x_{3,m} \le 0.18$$

$$20 \text{ km/h} \le x_{4,m} \le 100 \text{ km/h}$$

where the decision variables of the $m_{th}$ input data vector $\vec{x}_m = [x_{1,m}, x_{2,m}, x_{3,m}, x_{4,m}]^{transpose}$ are defined as $$x_{1,m} = P_{N,m}, x_{2,m} = P_{H,m}, x_{3,m} = NR_m, x_{4,m} = V_m.$$

6. The three layer cascade ANFIS of claim 1, wherein the second ANFIS controller of the APC in the second layer has four inputs ($y_{1,m}$, $y_{2,m}$, $y_{3,m}$, $y_{4,m}$) comprising the user speed ($V_m$), data rate ($R_{b,m}$), transceiver BER and SINR and one output is the transmit power (P); a Gaussian membership function of user speed is divided into three levels, a Gaussian membership function of a data rate is divided into three levels, a Gaussian membership function of a data rate is divided into three levels, a Gaussian membership function of SINR is divided into 2 levels; 54 fuzzy inference rules; the output transmit power is divided into 20 levels with a power increment of 1 dB; the optimization objection of minimum transmit power of the APC is formally formulated as follows:

$$\text{optimization assignment } \Delta P = f(\vec{y}_m)$$

subject to:

$$\Delta P \in \{0 \sim 20 \text{ dB}\}$$

$$20 \text{ km/hr} \le y_{1,m} \le 100 \text{ km/hr}$$

$$64 \text{ kbps} \le y_{2,m} \le 512 \text{ kbps}$$

$$-10 \text{ dB} \le y_{3,m} \le 20 \text{ dB}$$

$$y_{4,m} \le 10^{-5}$$

where the decision variables of the $m_{th}$ input data $\vec{y}_m = [y_{1,m}, y_{2,m}, y_{3,m}, y_{4,m}]^{transpose}$ are defined as $$y_{1,m} = V_m, y_{2,m} = R_{b,m}, y_{3,m} = SINR_m, y_{4,m} = BER_m.$$

7. The three layer cascade ANFIS of claim 1, wherein the third ANFIS controller of the AIC in the third layer has three inputs ($z_{1,m}$, $z_{2,m}$, $z_{3,m}$) comprising the angular spread ($W_m$), SINR ($S_m$), and interference DOA ($D_m$) and one output is a number of nulls (q); a triangular membership function of interference DOA is divided into six levels; a triangular membership function of angular spread is divided into six levels; a triangular membership function of SINR is divided into 14 levels, 504 fuzzy inference rules, the output number of nulls is divided into 6 levels; the optimization object of the AIC is formally formulated as follows:

The optimization object of the AIC is to minimize the interference of the receiver optimally assign the minimum number of nulls $$q = f(\vec{x})$$

subject to $\vec{z}_m \in \{z_{1,m}, z_{2,m}, \text{ and } z_{3,m}\}$ $$q \in \{1, 2, 3, 4 \text{ and } 5 \text{ nulls}\}$$

$$-70° \le z_{1,m} \le 70°$$

$$5.73° \le z_{2,m} \le 17.25°$$

$$-30 \text{ dB} \le z_{3,m} \le 0 \text{ dB}$$

$$SINR_o \ge 30 \text{ dB}$$

where the decision variables of the $m_{th}$ input data vector $\vec{z}_m = [z_{1,m}, z_{2,m}, z_{3,m}]^{transpose}$ are defined as $$z_{1,m} = D_m, z_{2,m} = W_m, z_{3,m} = S_m.$$

\* \* \* \* \*